(12) United States Patent
Shiraishi et al.

(10) Patent No.: US 10,399,438 B2
(45) Date of Patent: Sep. 3, 2019

(54) DATA PROCESSING APPARATUS

(71) Applicant: FUJITSU TEN LIMITED, Kobe-shi, Hyogo (JP)

(72) Inventors: Haruki Shiraishi, Kobe (JP); Munenori Maeda, Kobe (JP); Kohei Ono, Kobe (JP); Toshio Tanabe, Kobe (JP); Lin Li, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 314 days.

(21) Appl. No.: 14/886,950

(22) Filed: Oct. 19, 2015

(65) Prior Publication Data
US 2016/0155004 A1 Jun. 2, 2016

(30) Foreign Application Priority Data

Nov. 28, 2014 (JP) ................. 2014-240961

(51) Int. Cl.
H04N 5/77 (2006.01)
B60K 35/00 (2006.01)
G06K 9/00 (2006.01)
G08G 1/01 (2006.01)
G08G 1/00 (2006.01)
G07C 5/00 (2006.01)
G07C 5/08 (2006.01)

(52) U.S. Cl.
CPC .......... *B60K 35/00* (2013.01); *G06K 9/00335* (2013.01); *G06K 9/00791* (2013.01); *G07C 5/008* (2013.01); *G08G 1/0112* (2013.01); *G08G 1/0133* (2013.01); *G08G 1/20* (2013.01); *H04N 5/77* (2013.01); *G07C 5/0866* (2013.01)

(58) Field of Classification Search
CPC ...... B60K 35/00; H04N 5/77; H04N 5/23245; G06K 9/00335; G06K 9/00791; G06K 9/00805; G06K 9/00845; G07C 5/00; G08G 1/0112; G08G 1/0133; G08G 1/20
See application file for complete search history.

(56) References Cited

U.S. PATENT DOCUMENTS 9,346,468 B2 * 5/2016 Chundrlik, Jr. ... B60W 50/0098
9,524,269 B1 * 12/2016 Brinkmann ............. G06F 17/00
2003/0210806 A1 * 11/2003 YoichiShintani .. G01C 21/3647
382/104

(Continued)

FOREIGN PATENT DOCUMENTS

JP 2003-002256 A 1/2003
JP 2007-141211 A 6/2007

(Continued)

Primary Examiner — Anner N Holder
(74) Attorney, Agent, or Firm — Oliff PLC

(57) ABSTRACT

A data processing apparatus processes moving image data that shows a vicinity of a vehicle and that is recorded while the vehicle is running. The data processing apparatus includes a controller configured to: acquire behavioral information on a specific behavior of the vehicle during an image capturing period of the moving image data; acquire object information on an object in the vicinity of the vehicle during the image capturing period of the moving image data; and determine a cause of the specific behavior of the vehicle based on the behavioral information and the object information.

14 Claims, 21 Drawing Sheets

(56) References Cited

U.S. PATENT DOCUMENTS

| | | | | |
|---|---|---|---|---|
| 2004/0119819 | A1* | 6/2004 | Aggarwal | G06K 9/00771 348/143 |
| 2005/0123173 | A1* | 6/2005 | Isaji | B60W 10/18 382/104 |
| 2006/0204039 | A1* | 9/2006 | Maemura | B60T 7/22 382/104 |
| 2007/0222877 | A1* | 9/2007 | Kurane | H04N 5/3535 348/294 |
| 2008/0122603 | A1 | 5/2008 | Plante et al. | |
| 2010/0235145 | A1* | 9/2010 | Ascari | B25J 9/1612 702/190 |
| 2011/0123961 | A1* | 5/2011 | Staplin | G09B 9/052 434/64 |
| 2011/0128138 | A1* | 6/2011 | Yamamoto | B60W 30/0956 340/436 |
| 2012/0019375 | A1* | 1/2012 | Kataoka | B60W 50/14 340/439 |
| 2012/0218412 | A1* | 8/2012 | Dellantoni | G01C 21/3602 348/148 |
| 2013/0010112 | A1* | 1/2013 | Goto | H04N 7/18 348/148 |
| 2013/0027564 | A1* | 1/2013 | Solhusvik | H04N 5/3698 348/187 |
| 2013/0096731 | A1* | 4/2013 | Tamari | G06F 11/3013 701/1 |
| 2013/0194127 | A1* | 8/2013 | Ishihara | G01S 13/18 342/70 |
| 2015/0178884 | A1* | 6/2015 | Scholl | G06T 3/0018 348/36 |
| 2015/0336547 | A1* | 11/2015 | Dagan | B60T 7/22 701/70 |
| 2016/0117947 | A1* | 4/2016 | Misu | G09B 9/04 434/62 |

FOREIGN PATENT DOCUMENTS

| | | |
|---|---|---|
| JP | 2008-176638 A | 7/2008 |
| JP | 2009-040107 A | 2/2009 |
| JP | 2009-083815 A | 4/2009 |
| JP | 2011-076443 A | 4/2011 |
| JP | 2011-100298 A | 5/2011 |
| JP | 2012-027623 A | 2/2012 |
| JP | 2013-206031 A | 10/2013 |

* cited by examiner

DATA PROCESSING APPARATUS

BACKGROUND OF THE INVENTION

Field of the Invention

This invention relates to a technology for processing moving image data showing the vicinity of the vehicle.

Description of the Background Art

Conventionally, drive recorders are used which periodically acquires still images showing the vicinity of the vehicle using a camera, and in the case an incident (an accident or an event of a potential accident) occurs while the vehicle is running, record the moving image data based on a plurality of still images taken before and after the occurrence.

In recent years, some business operators running businesses that use multiple business vehicles such as trucks, busses, and taxies mount drive recorders on all the vehicles used in the business.

Such business operators install a data processing apparatus in the office. The data processing apparatus fetches the moving image data recorded by the drive recorder mounted on each vehicle and reproduce the moving image data. The business operators utilize the moving image data for driver safety guidance and other purposes by understanding the status at the occurrence of the incident based on such moving image data.

The business operators specifically understand the status at the occurrence of the incident by reproducing the moving image data acquired by the drive recorder using the data processing apparatus and actually checking the contents of the moving image data by personnel in charge.

However, some business operators find this checking operation of these contents time-consuming since there are too many moving image data to be reproduced. Hence, there is a demand for technologies that are capable of efficiently performing the checking operation. As one such technologies, a technology is desired which allows easy understanding of the cause of the specific behavior such as a sudden braking during the image capturing period of the moving image data.

SUMMARY OF THE INVENTION

According to one aspect of the invention, a data processing apparatus for processing moving image data that shows a vicinity of a vehicle and that is recorded while the vehicle is running. The data processing apparatus includes a controller configured to: acquire behavioral information on a specific behavior of the vehicle during an image capturing period of the moving image data; acquire object information on an object in the vicinity of the vehicle during the image capturing period of the moving image data; and determine a cause of the specific behavior of the vehicle based on the behavioral information and the object information.

Since the cause of the specific behavior is determined based on the behavioral information and the object information, the cause of the specific behavior can be understood easily afterward.

According to another aspect of the invention, the controller determines a cause object in the vicinity of the vehicle, the cause object having been determined to be the cause of the specific behavior of the vehicle.

The cause object that has been determined to be the cause of the specific behavior can be understood easily afterward.

According to another aspect of the invention, the controller determines a state of a driver of the vehicle, the state of the driver having been determined to be the cause of the specific behavior of the vehicle.

The state of the driver of the vehicle which has been determined to be the cause of the specific behavior can be understood easily afterward.

Therefore, an object of the invention is to understand a cause of a specific behavior easily.

These and other objects, features, aspects and advantages of the invention will become more apparent from the following detailed description of the invention when taken in conjunction with the accompanying drawings.

DESCRIPTION OF THE EMBODIMENTS

Hereinafter, with reference to the accompanying drawings, embodiments will be described.

<1. First Embodiment>

<1-1. Outline of the System>

Figure 1:
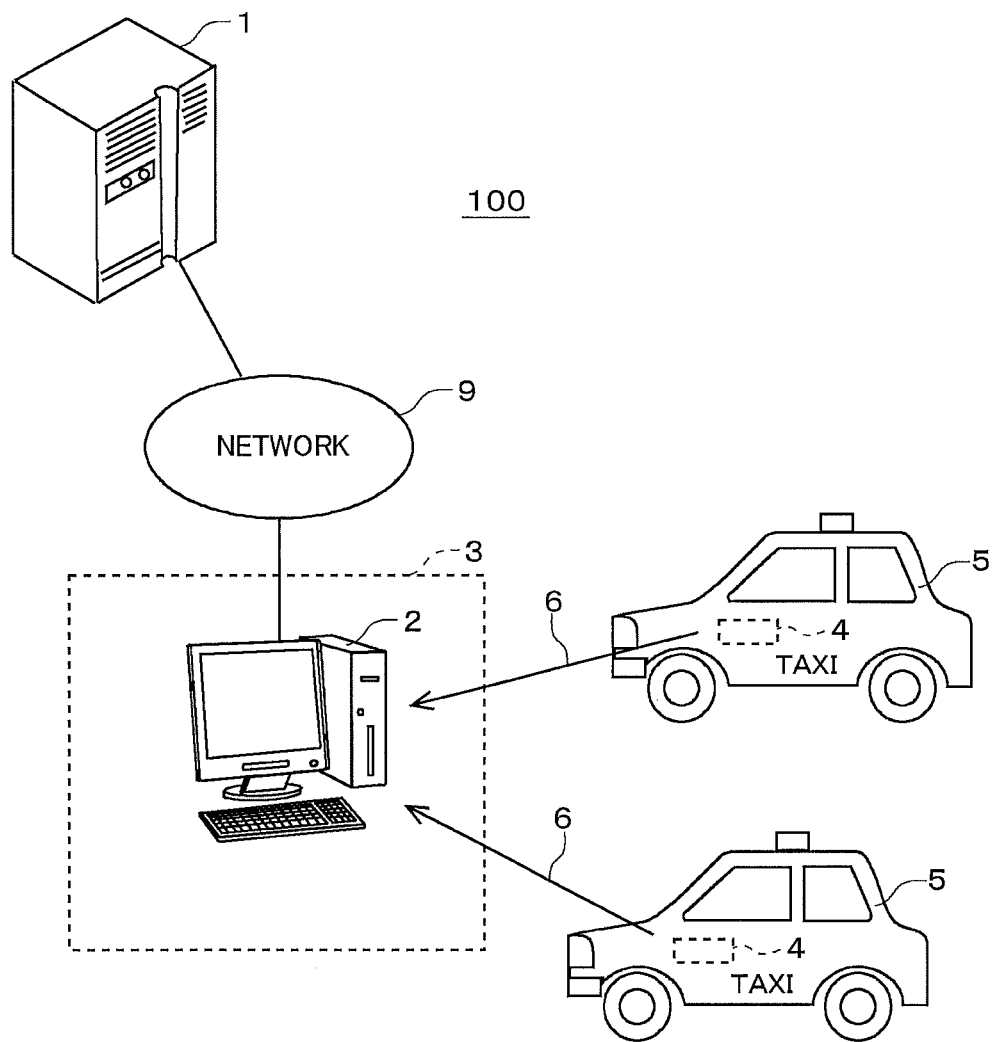
FIG. 1 illustrates an outline of the recorder system.

FIG. 1 illustrates an outline of a recorder system 100 for processing the moving image data recorded while the vehicle is running The recorder system 100 includes a server 1, a data processing apparatus 2, and a drive recorder 4. The recorder system 100 is adopted by business operators that operate the business using a plurality of business vehicles such as trucks, busses, and taxies. Explanation is provided below, taking a case where the recorder system 100 is adopted by a business operator of a taxi business.

At the business operator, the business is conducted using a plurality of vehicles 5 serving as a taxi. Each of the plurality of vehicles 5 is equipped with the drive recorder 4 for recording the moving image data showing a state of a vicinity of the vehicle while the vehicle is running. Also, at an office 3 which manages the plurality of vehicles 5, the data processing apparatus 2 for processing the moving image data recorded by the drive recorder 4 is provided.

Also, the data processing apparatus 2 is connected to a wide area network 9 such as the Internet. The data processing apparatus 2 is capable of communicating with the server 1 located outside of the office 3, via the network 9. The server 1 receives the moving image data from the data processing apparatus 2 and replies information which is processing results of the moving image data, to the data processing apparatus 2. The server 1 may be managed by the business operator or may be managed by a group different from the business operator.

The drive recorder 4 of each vehicle 5 includes a camera for acquiring a still image by capturing an image of a front of the vicinity of the vehicle 5 and a volatile image memory which records the still images. The drive recorder 4 acquires the still images which show the state of the front of the vicinity of the vehicle 5 using the camera in a predetermined cycle (e.g. 1/30-second cycle) and stores the still images into the image memory. Thus, the drive recorder 4 always stores a plurality of the still images in the image memory acquired in a most recent predetermined time (e.g. for 30 seconds).

Then, the drive recorder 4, in a case where an incident (an accident or an event of a potential accident) occurs while the vehicle 5 is running, stores the moving image data based on the plurality of still images relating to before and after the occurrence of the incident in a memory card, a portable recording media. A sudden braking which is a specific behavior of the vehicle 5 is one of such incidents.

The drive recorder 4 is capable of acquiring both the velocity and acceleration of the vehicle 5, and determines that an incident has occurred when the velocity or acceleration of the vehicle 5 satisfies predetermined conditions. The drive recorder 4 stores, in the memory card, the moving image data including the plurality of still images acquired for a total of 20 seconds, for example, 12 seconds before the occurrence of the incident and 8 seconds after the occurrence of the incident. Each of the plurality of still images included in the moving image data serves as a frame of moving image data.

In the specification, a period in which a plurality of still images included in the moving image data are acquired (for 20 seconds before and after the occurrence of the incident) is referred to as "image capturing period" of the moving image data.

Also, the drive recorder 4 associates a driver code for identifying a driver (taxi driver) of the vehicle 5, a velocity and an acceleration of the vehicle 5, a date and time of occurrence of the incident, etc. with the moving image data as additional information and stores the driver code, the velocity/acceleration of the vehicle 5, the date/time of the occurrence of the incident, etc. in memory card. Thus, the moving image data is associated with the driver of the vehicle 5 on which moving image data is recorded. The additional information includes time-series data during the image capturing period of the moving image data in relation to the velocity and acceleration of the vehicle 5.

The data processing apparatus 2 is capable of taking in moving image data 6 recorded by the drive recorder 4 of each vehicle 5 via the memory card. The data processing apparatus 2 may take in the moving image data 6 from the drive recorder 4 using a wired or a wireless data communication.

The data processing apparatus 2 has a function for reproducing the moving image data. In addition, the data processing apparatus 2 has a function for determining a cause of a sudden braking in a case where the sudden braking has been applied during the image capturing period of the moving image data.

Also, the server 1 has a function for recognizing an object included in the moving image data as an image. The server 1 receives the moving image data recorded by the drive recorder 4 from the data processing apparatus 2 and recognizes the object existing in the vicinity of the vehicle 5 during the image capturing period of the moving image data. The server 1 transmits object information on the object recognized to the data processing apparatus 2. The data processing apparatus 2 determines the cause of the sudden braking based on the object information. Further details of such server 1 and the data processing apparatus 2 are described below.

<1-2. Server>

Figure 2:
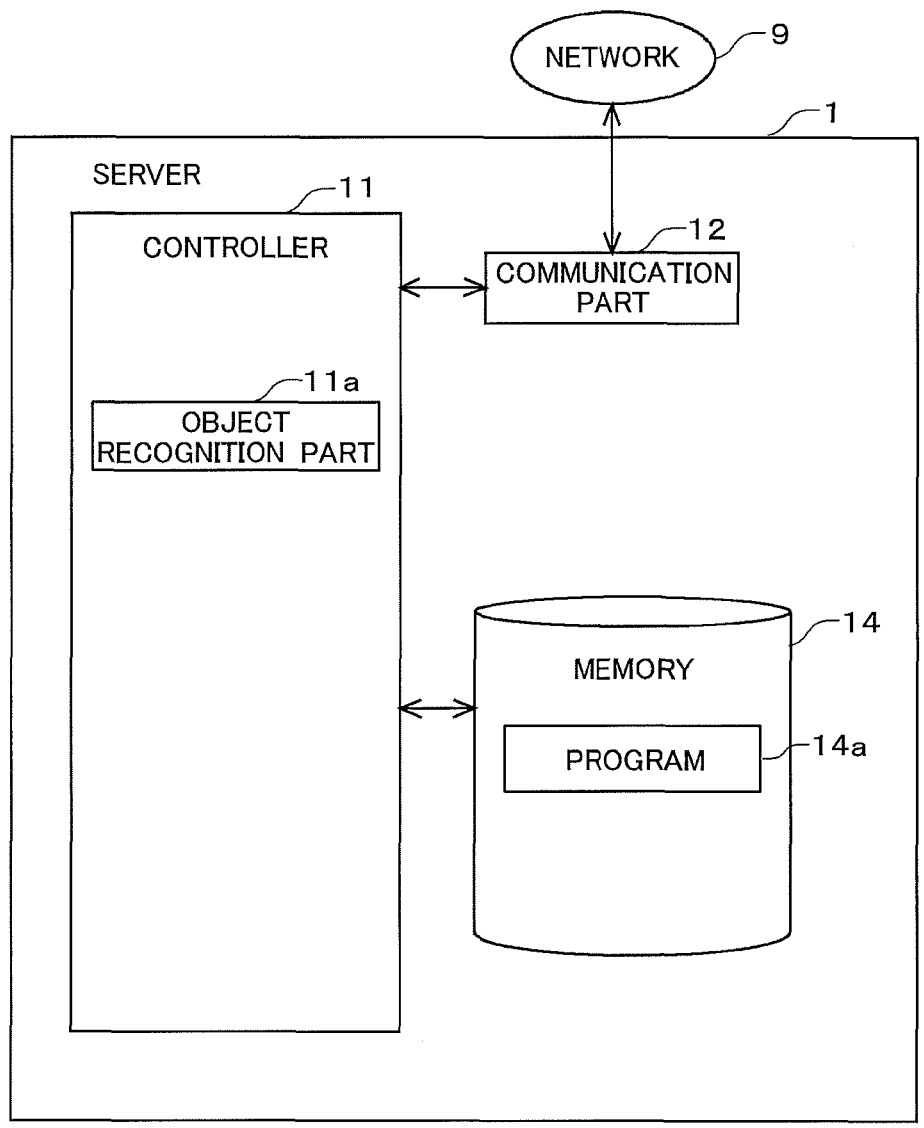
FIG. 2 illustrates the configuration of a server.

First, the server 1 is described. FIG. 2 illustrates a configuration of the server 1. The server 1 includes a controller 11, a communication part 12, and a memory 14.

The controller 11 is, for example, a computer including a CPU, a RAM, a ROM, etc. The controller 11 includes a high-performance CPU and is capable of executing image processing with high load at high speed.

The communication part 12 performs communication via the network 9. The server 1 is capable of transmitting and receiving data to/from the data processing apparatus 2 via the communication part 12.

The memory 14 is, for example, a hard disk that is a non-volatile memory storage apparatus capable of storing various data. In the memory 14, a program 14a is stored. The function required as the server 1 is implemented by the CPU in the controller 11 by executing the program 14a (performing the arithmetic processing in accordance with the program 14a). An object recognition part 11a, shown in FIG. 2, is one of the functions of the server 1 which is implemented by the execution of the program 14a.

The object recognition part 11a performs an object recognition processing for recognizing the object included in each frame of the moving image data as an image. In a case of the moving image data recorded by the drive recorder 4, the object recognition part 11a recognizes objects such as a pedestrian or another vehicle existing in the vicinity of the vehicle 5 during the image capturing period of the moving image data.

Figure 3:
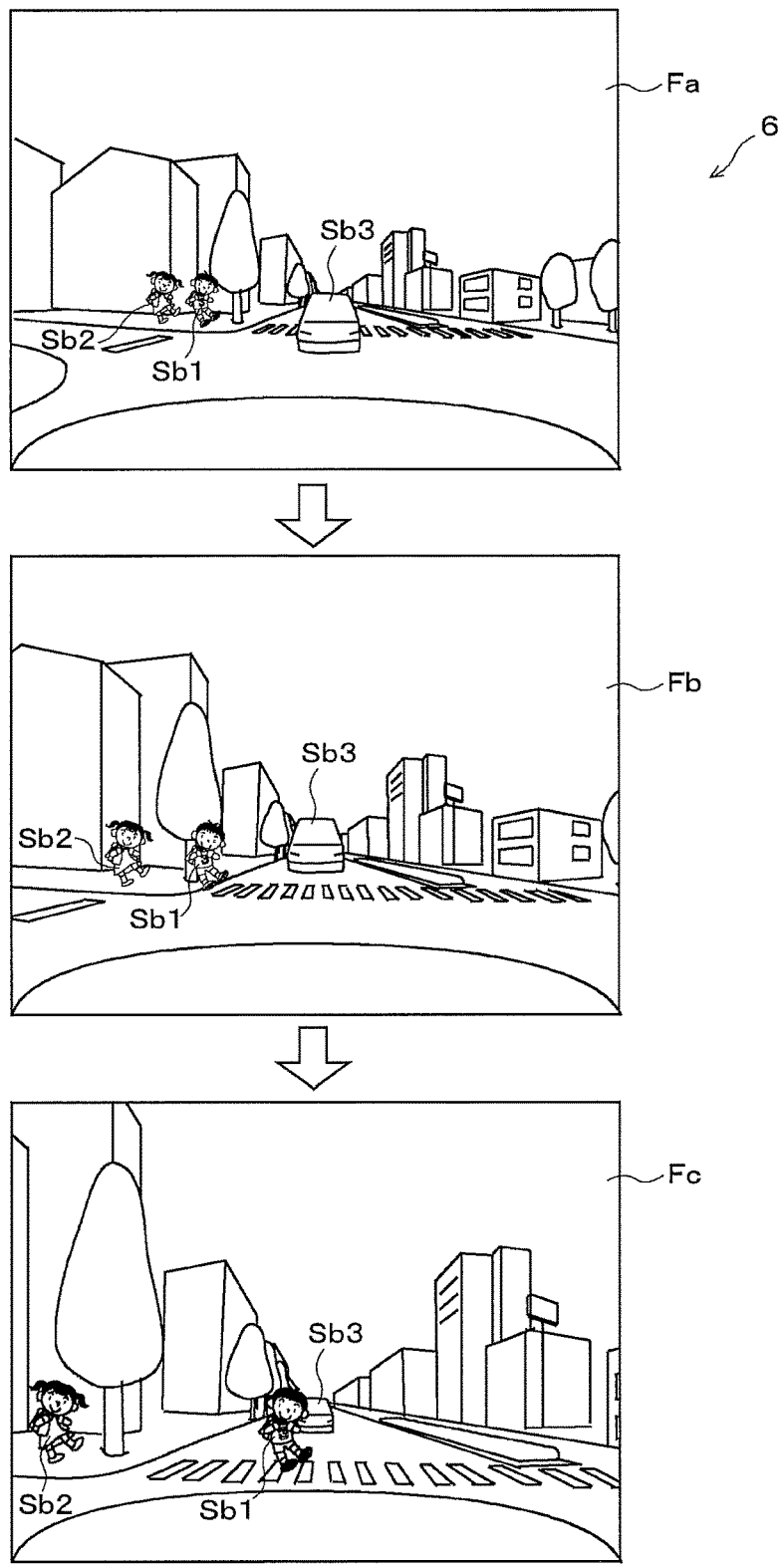
FIG. 3 illustrates an example of the moving image data recorded using the drive recorder.

FIG. 3 illustrates an example of the moving image data 6 recorded by the drive recorder 4 when a sudden braking is applied in the vehicle 5. FIG. 3 shows three typical frames Fa to Fc of many frames included in the moving image data 6. Of the three frames Fa to Fc, the frame Fa shown at a top of the FIG. 3 is an oldest frame, and the frame Fc shown at a bottom of the FIG. 3 is a latest frame.

During the image capturing period of the moving image data 6, the vehicle 5 is stopped due to a sudden braking applied. A time point when the frame Fb shown in a middle of FIG. 3 has been acquired corresponds to a starting point of the sudden braking and a time point when the frame Fc shown at the bottom of FIG. 3 has been acquired corresponds to an ending point of the sudden braking (when the vehicle 5 is stopped).

In these frames Fa to Fc, images of two pedestrians Sb1 and Sb2, as well as an other vehicle Sb3 are included. The object recognition part 11a recognizes such pedestrians Sb1 and Sb2 as well as the other vehicle Sb3 by the object recognition processing.

The object recognition part 11a recognizes an object, for example, by an object recognition method combining the frame correlation method and the pattern recognition method. As for the frame correlation method, for example, an optical flow method may be adopted. In the optical flow method, objects are recognized based on orientations of optical flows indicating motion of feature points between consecutive frames, and the feature points are extracted from the frames. The object recognition part 11a is capable of recognizing an object in motion relative to the background, using the optical flow method.

Also, as for the pattern recognition method, for example, a template matching method may be employed. In the template matching method, objects are recognized by searching a region approximated to a template image from one frame, and the template image showing an appearance of an object to be detected are prepared as a pattern in advance. The object recognition part 11a is capable of recognizing an object stationary relative to the background, using such the template matching method.

The object recognition part 11a recognizes the object based on the moving image data, using such object recognition method. Then, the object recognition part 11a detects the position of the image recognized in each frame (hereinafter, referred to as "intra-frame position"). The object recognition part 11a processes objects of which intra-frame positions in the frames are adjacent to each other as a same object. Furthermore, the object recognition part 11a detects a relative states of the object to the vehicle 5 in each frame (hereinafter, referred to as "vehicle relative state") based on the intra-frame position of each object. Specifically, the object recognition part 11a detects any of "existing in front of the vehicle," "existing on a side of the vehicle" and "across the front of the vehicle" as the vehicle relative state.

The object recognition part 11a transmits such recognition results of objects as the object information to the data processing apparatus 2. The object information includes the intra-frame position and the vehicle relative state of the recognized object in each frame. In a case where the object recognition part 11a recognizes a plurality of objects, the intra-frame position and the vehicle relative state on respective frame of the plurality of objects recognized are included in the object information.

<1-3. Data Processing Apparatus>

Figure 4:
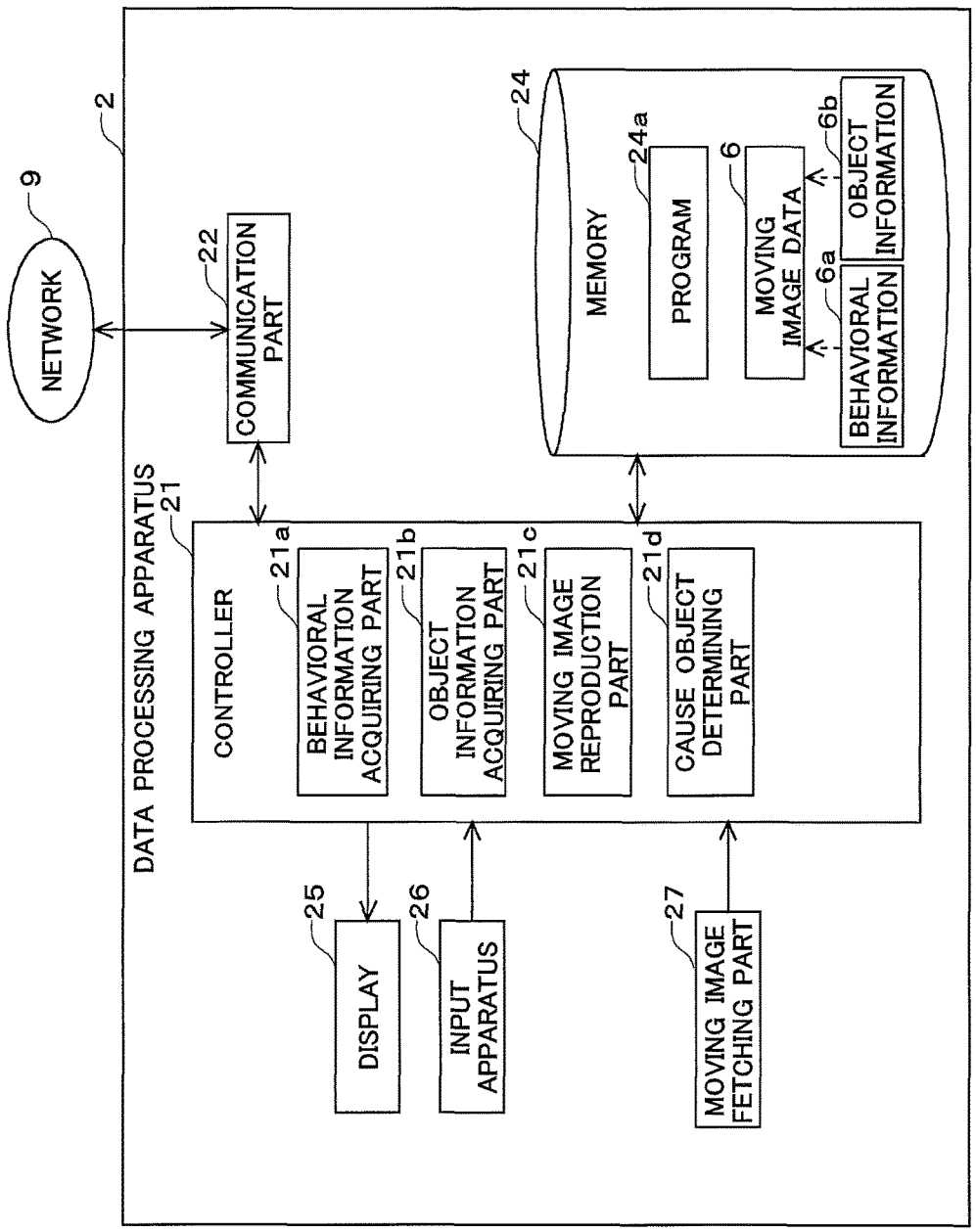
FIG. 4 illustrates the configuration of a data processing apparatus in the first embodiment.

Next, the data processing apparatus 2 is described. FIG. 4 illustrates a configuration of the data processing apparatus 2. The data processing apparatus 2 includes a controller 21, a communication part 22, a display 25, an input apparatus 26, a moving image fetching part 27, and a memory 24.

The controller 21 is, for example, a computer including a CPU, a RAM, a ROM, etc. The communication part 22 performs communication via the network 9. The data processing apparatus 2 is capable of transmitting and receiving data to/from the server 1 by the communication part 22.

The display 25 is for displaying various information and includes, for example, a liquid crystal display. The input apparatus 26 is for accepting a user operation, and includes, for example, a keyboard, a mouse, or a touch panel and the like.

The moving image fetching part 27 is for fetching the moving image data recorded by the drive recorder 4 and includes, for example, a card reader for reading the recorded contents in the memory card. The moving image fetching part 27 reads out the moving image data from a memory card and inputs the moving image data to the controller 21. In the case of capturing the moving image data using the data communication, the moving image fetching part 27 includes, for example, a communication apparatus for performing data communications and others.

The memory 24 includes, for example, a hard disk of non-volatile storage apparatus capable of storing various data. The moving image data fetched in the moving image fetching part 27 is stored in the memory 24. The moving image fetching part 27 fetches the moving image data recorded in each of the drive recorder 4 of the plurality of vehicle 5. Therefore, the memory 24 stores many moving image data 6.

Also, the memory 24 stores the program 24a. Such program 24a is acquired by downloading via the network 9 or by reading out from a non-transitory computer-readable recording medium such as a memory card.

The function required as the data processing apparatus 2 is implemented by the CPU in the controller 21 by executing the program 24a (performing the arithmetic processing in accordance with the program 24a). A behavioral information acquiring part 21a, an object information acquiring part 21b, a moving image reproduction part 21c, and a cause object determining part 21d, shown in FIG. 4 are part of the functions of the data processing apparatus 2 which is implemented by the execution of the program 24a.

The behavioral information acquiring part 21a acquires the behavioral information on a sudden braking during the image capturing period of the moving image data. In a case where the sudden braking has been applied during the image capturing period of the moving image data, the behavioral information acquiring part 21a acquires a time at which the sudden braking has been applied, as the behavioral information.

The object information acquiring part 21b acquires the object information on the object in the vicinity of the vehicle 5 during the image capturing period of the moving image data. The object information acquiring part 21b acquires the object information from the server 1 by performing data communications with the server 1, using the communication part 22.

The moving image reproduction part 21c reproduces the moving image data recorded by the drive recorder 4. The moving image reproduction part 21c, when reproducing the moving image data, displays a plurality of frames included in the moving image data on the display 25 consecutively in time.

Also, in the case where a sudden braking has been applied during the image capturing period of the moving image data, the cause object determining part 21d determines a cause object that is an object in the vicinity of the vehicle 5 and that is a cause of the sudden braking.

Details of processing of these behavioral information acquiring part 21a, object information acquiring part 21b, and the cause object determining part 21d are described later.

<1-4. Processing of the Data Processing Apparatus>

Figure 5:
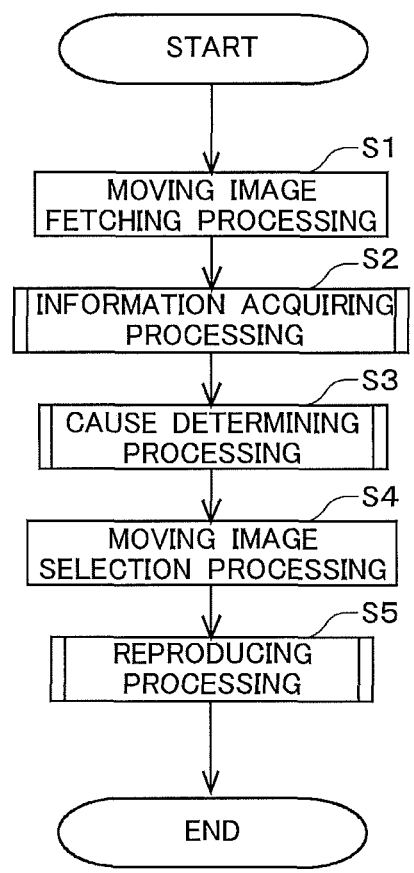
FIG. 5 illustrates a flow of main processing in the data processing apparatus.

Next, processing of the data processing apparatus 2 is described. FIG. 5 illustrates a flow of main processing on the moving image data of the data processing apparatus 2. First, the flow of the main processing of the data processing apparatus 2 is described referring to FIG. 5, and then a part of the processing is described in more detail.

First, the moving image fetching processing is performed for fetching the moving image data recorded by the drive recorder 4 (a step S1). The moving image fetching part 27 reads out the moving image data from the memory card and then stores the moving image data 6 read out in the memory 24 as shown in FIG. 4.

Next, the information acquisition processing is performed for acquiring the behavioral information and the object information on the fetched moving image data (a step S2). The behavioral information acquiring part 21a acquires the behavioral information and the object information acquiring part 21b acquires the object information. As shown in FIG. 4, the memory 24 stores the behavioral information 6a and the object information 6b acquired on the moving image data by associating the behavioral information 6a and the object information 6b with the moving image data 6.

Next, the cause determining processing is performed for determining the cause of a sudden braking applied during the image capturing period of the moving image data (a step S3). The cause object determining part 21d determines the cause of the sudden braking based on the behavioral information 6a and the object information 6b associated with the same moving image data 6. The cause object determining part 21d determines the cause object which is an object in the vicinity of the vehicle 5 and that is the cause of the sudden braking.

Such information acquisition processing (the step S2) and cause determining processing (the step S3) are performed for each of the moving image data fetched from the drive recorder 4. The moving image data, for which the information acquisition processing (the step S2) and the cause determining processing (the step S3) are completed, become selectable as a reproduction target.

Next, the moving image selection processing is performed for selecting the moving image data to be a reproduction target from among many moving image data stored in the memory 24 (a step S4). The display 25, by the control of the moving image reproduction part 21c, displays in a list the moving image data selectable as the reproduction target. Users, referring to such a list display, select the moving image data to be the reproduction target using the input apparatus 26.

Next, the reproduction processing is performed for reproducing the moving image data selected as the reproduction target (a step S5). The moving image reproduction part 21c reproduces the moving image data by displaying a plurality of frames included in the moving image data on the display 25 consecutively in time. During the reproduction period of the moving image data, the state in the vicinity of the vehicle 5 during the image capturing period of the moving image data is regenerated. Also, in the case where the cause object is determined, the moving image reproduction part 21c reproduces the moving image data so as to highlight the cause object.

<1-4-1. Information Acquisition Processing>

Figure 6:
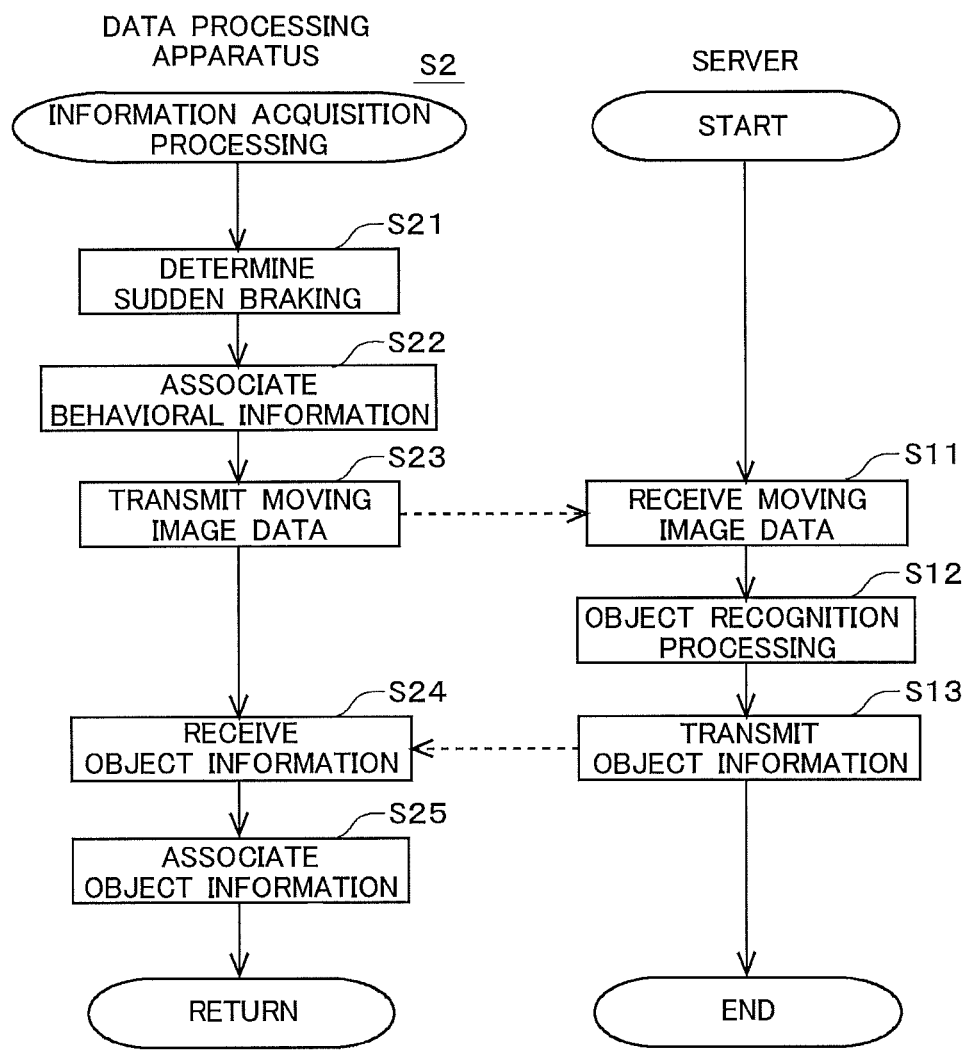
FIG. 6 illustrates a flow of the information acquisition processing.

Next, the information acquisition processing (the step S2 in FIG. 5) is described in more detail. FIG. 6 illustrates a detailed flow of the information acquisition processing. In the information acquisition processing, the data processing apparatus 2 performs data communications with the server 1. A left side of FIG. 6 shows a processing flow of the data processing apparatus 2, and a right side of FIG. 6 shows a processing flow of the server 1. The moving image data targeted to be processed in the description is referred to as "target moving image data."

First, the behavioral information acquiring part 21a determines whether or not the sudden braking has been applied during the image capturing period of the target moving image (a step S21). The, behavioral information acquiring part 21a refers to the time-series data of velocity and acceleration of the vehicle 5 included in the additional information associated with the target moving image data. Then, the behavioral information acquiring part 21a determines that the sudden braking has been applied in a case where any of the time-series data satisfies a predetermined determination condition. The determination condition for determining that the sudden braking has been applied, for example, is any of the following conditions (A) and (B).

(A) The acceleration in the deceleration direction reaches a predetermined value (for example, 0.40 G) or greater.

(B) The decrement of velocity in second reaches a predetermined threshold value (for example, 10 km/h) or greater.

In the case where the behavioral information acquiring part 21a determines that the sudden braking has been applied, the behavioral information acquiring part 21a further identifies the time at which the sudden braking has been applied based on the time-series data which satisfies the above determination condition. In the embodiment, the period from the starting point of the sudden braking to the ending point of the sudden braking is referred to as "time at which the sudden braking occurred." The ending point of the sudden braking corresponds to the time point when the vehicle 5 is stopped. The time at which the sudden braking occurred is identified as an elapsed time from the starting point of the image capturing period of the moving image data (during the reproduction, an elapsed time from the starting point of the reproduction period).

With such processing, the behavioral information acquiring part 21a acquires the behavioral information on the sudden braking during the image capturing period of the target moving image data. The behavioral information includes whether or not the sudden braking was applied and the time at which the sudden braking occurred.

Next, the behavioral information acquiring part 21a associates the acquired behavioral information with the target moving image data and stores the associated behavioral information in the memory 24 (a step S22). Thereby, the behavioral information is associated with the target moving image data.

Next, the object information acquiring part 21b transmits a request signal and the target moving image data requiring the object information to the server 1 via the communication part 22 (a step S23). The object recognition part 11a of the server 1 receives the request signal and the target moving image data via the communication part 12 (a step S11).

The object recognition part 11a performs the object recognition processing targeting the target moving image data received in response to the request signal (a step S12). The object recognition part 11a recognizes pedestrians and other vehicles in the vicinity of the vehicle 5 during the image capturing period of the target moving image data.

Then, the object recognition part 11a transmits a recognition result of the object as the object information to the data processing apparatus 2 via the communication part 12 (a step S13). As described above, the object information includes the intra-frame position and the vehicle relative state of each object recognized in each frame.

The object information acquiring part 21b of the data processing apparatus 2 receives the object information via the communication part 22 (a step S24). Thereby, the object information acquiring part 21b acquires the object information on the object in the vicinity of vehicle 5 during the image capturing period of the target moving image data.

Next, the behavioral information acquiring part 21a associates the acquired object information with the target moving image data and stores the acquired object information in the memory 24 (a step S25). Thereby, the object information is associated with the target moving image data.

As a result of such information acquisition processing, the behavioral information 6a and the object information 6b on the same moving image data 6 are associated via the moving image data 6 (Refer to FIG. 4.).

<1-4-2. Cause Determining Processing>

Figure 7:
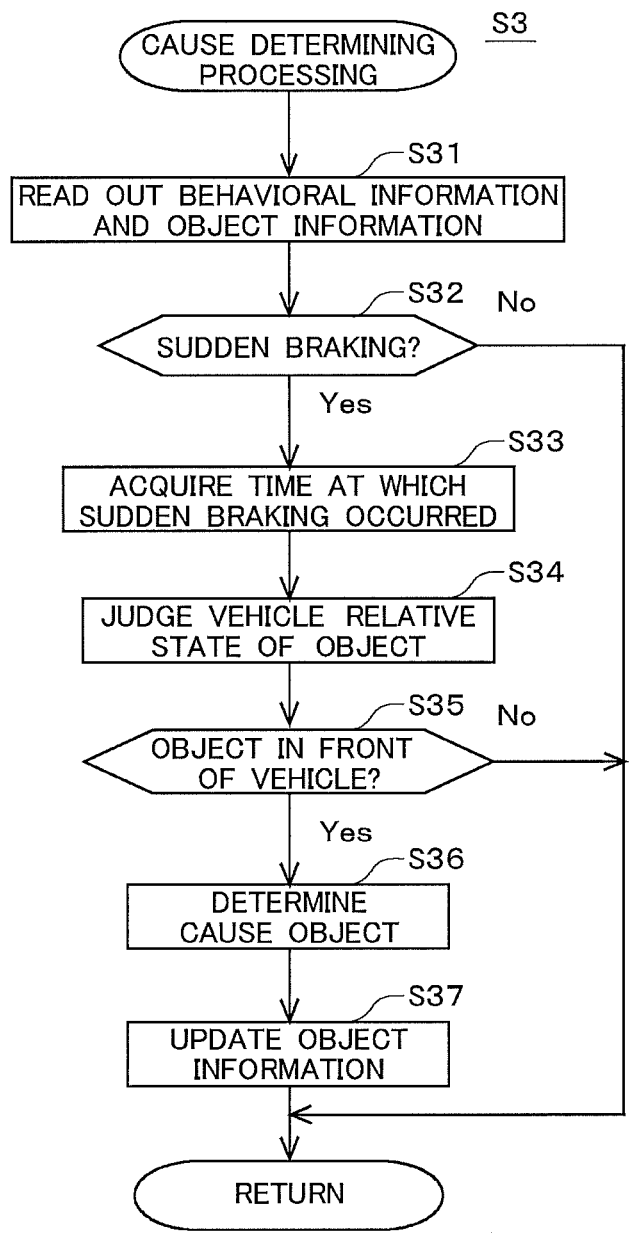
FIG. 7 illustrates a flow of the cause determining processing in the first embodiment.

Next, the cause determining processing (the step S3 in FIG. 5) is described in more detail. FIG. 7 illustrates a flow of the cause determining processing. In the description, the moving image data to be processed is referred to as "target moving image data".

First, the cause object determining part 21d reads out the behavioral information 6a and the object information 6b associated with the target moving image data 6, from the memory 24 (a step S31). Next, the cause object determining part 21d refers to whether or not the sudden braking has been applied during the image capturing period of the target moving image data shown by the behavioral information. Thereby, in the case where no sudden braking has been applied (No in a step S32), the cause determining processing is ended.

Meanwhile, in the case where the sudden braking has been applied (Yes in the step S32), the cause object determining part 21d determines the cause object that is the object in the vicinity of the vehicle 5 and that is the cause of the sudden braking, based on the behavioral information and the object information associated with the target moving image data.

Specifically, the cause object determining part 21d acquires the time at which the sudden braking occurred in the target moving image data, referring to the behavioral information (a step S33).

Subsequently, the cause object determining part 21d, based on the object information, judges the vehicle relative state of each object in the vicinity of the vehicle 5 at the time at which the sudden braking occurred (a step S34). That is, the cause object determining part 21d identifies frames corresponding to the time at which the sudden braking occurred and judges the vehicle relative state of each object in the identified frames. The cause object determining part 21d judges the relative state of each object to the vehicle 5 is applicable to any of "existing in front of the vehicle," "existing on the side of the vehicle" and "across the front of the vehicle."

And, in the case where the object has existed in the front of the vehicle 5, that is the travelling direction of the vehicle 5, at the time at which the sudden braking occurred (Yes in a step S35), the cause object determining part 21d determines that the object is the cause object (a step S36). The cause object determining part 21d judges the object of which the vehicle relative state is "existing in front of the vehicle" or "across the front of the vehicle" as the object that has existed in front of the vehicle 5. The cause object determining part 21d may determine not only one object but also a plurality of objects as the cause object(s).

After determining an object to be the cause object, the cause object determining part 21d updates the object information 6b associated with the target moving image data 6 so as to include the information for discerning that the object is the cause object (a step S37).

At the time at which the sudden braking occurred, in the case where no object has existed in front of the vehicle (No in the step S35), the cause object is not determined and the cause determining processing is ended directly.

<1-4-3. Reproduction Processing>

Figure 8:
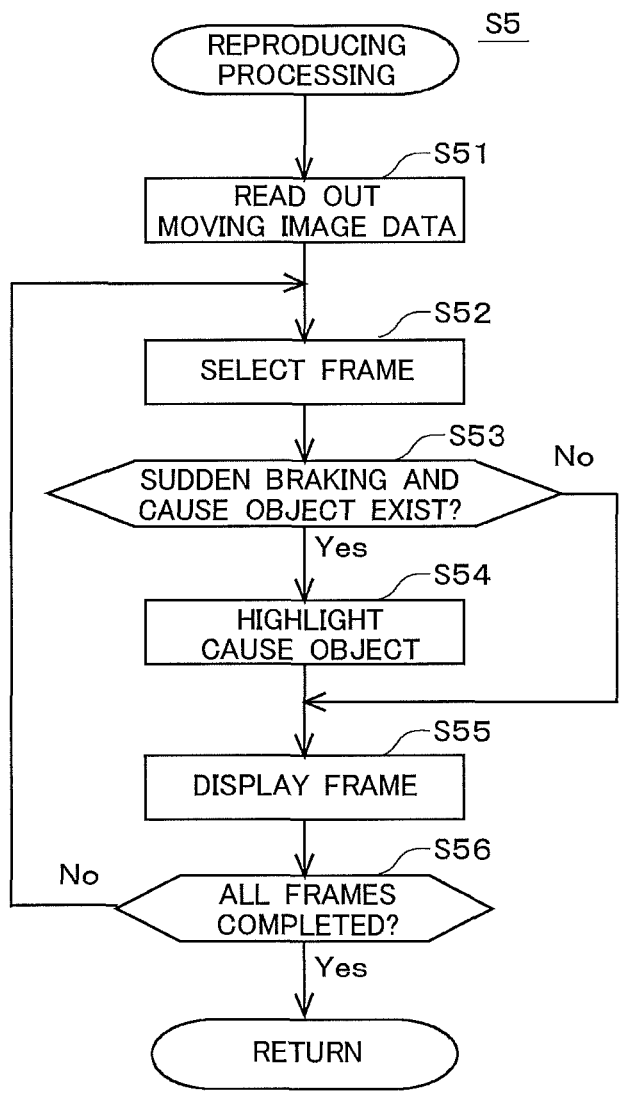
FIG. 8 illustrates a flow of the reproduction processing.

Next, the reproduction processing (the step S5 in FIG. 5) is described in detail. FIG. 8 illustrates a detailed flow of the reproduction processing. As described above, the moving image selection processing (the step S4 in FIG. 5) is performed ahead of the reproduction processing, and the moving image data to be the reproduction target is selected by the user. In this description, the moving image data to be the reproduction target is referred to as "target moving image data."

First, the moving image reproduction part 21c reads out the target moving image data from the memory 24 (a step S51). In this case, the moving image reproduction part 21c reads out the behavioral information 6a and the object information 6b associated with the target moving image data 6 in conjunction from the memory 24.

Thereafter, the moving image reproduction part 21c repeats the processing to display each of the plurality of frames included in the target moving image data on the display 25 until the processing is completed for all frames of the target moving image data (a step S52 to S56). In such processing, the moving image reproduction part 21c highlights the cause object in the case where there is the cause object of the sudden braking.

First, the moving image reproduction part 21c selects one frame of the target moving image data in accordance with the order of frames (the step the S52).

Next, the moving image reproduction part 21c determines, based on the behavioral information and the object information, whether or not the sudden braking has been applied during the image capturing period of the target moving image data and whether or not there has been a cause object (a step S53). In the case where no sudden braking has been applied or there has been no cause object (No in the step S53), the moving image reproduction part 21c displays the selected frame on the display 25 without highlighting (a step S55).

Meanwhile, in the case the sudden braking has been applied and there has been the cause object (Yes in the step S53) and also in the case where the image of the cause object is included in the selected frame, the moving image reproduction part 21c highlights the image of the cause object by enclosing the image of the cause object with a marker (a step S54). The position of the image of the cause object can be identified based on the intra-frame position of the cause object included in the object information.

Next, the moving image reproduction part 21c displays the selected frame on the display 25 (the step S55). Thereby, in the case where there is the cause object which is the cause of the sudden braking, the cause object is displayed highlighted on the display 25.

Figure 9:
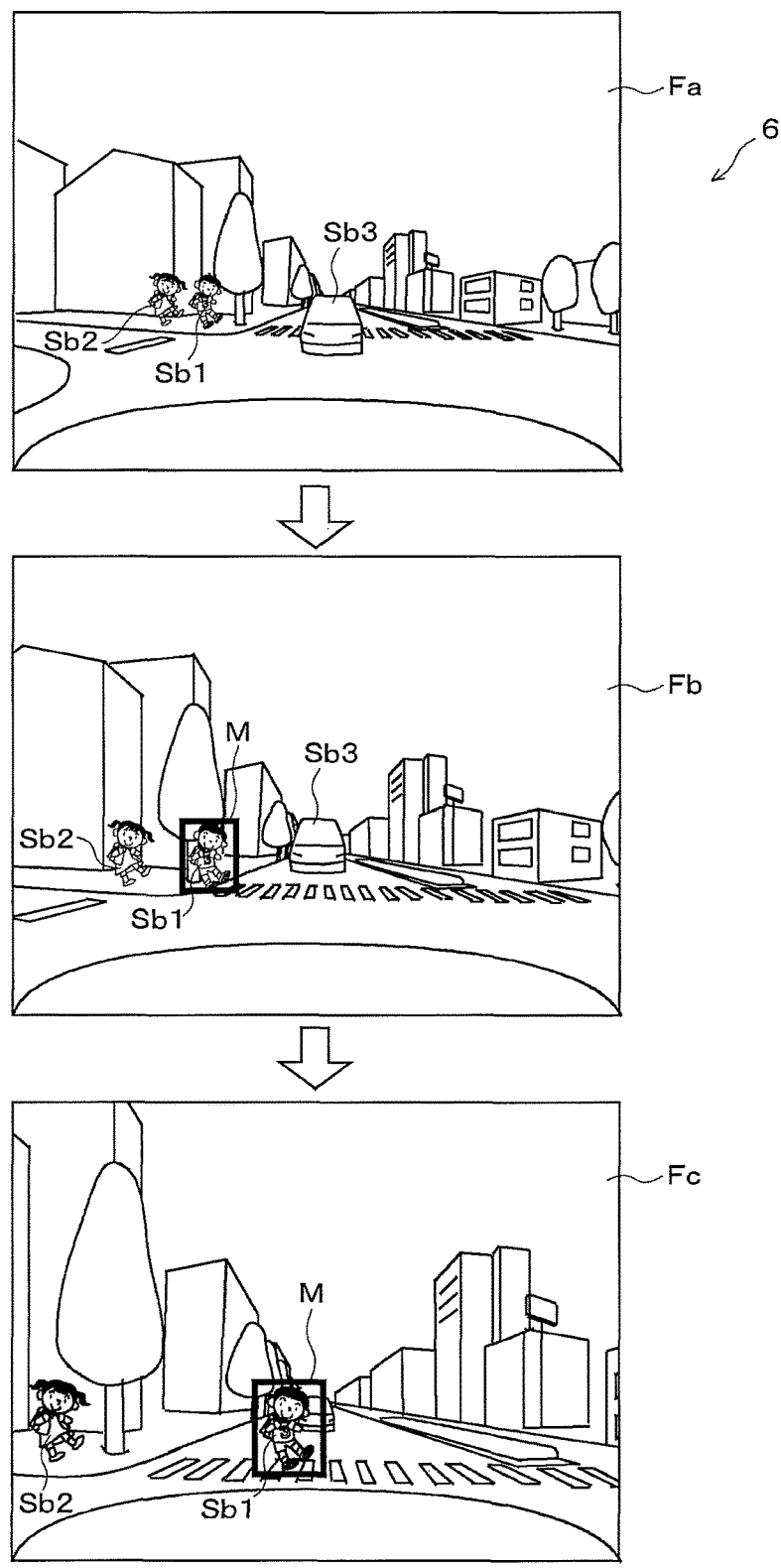
FIG. 9 illustrates a display example of the display during the reproduction of the moving image data.

FIG. 9 illustrates a display example of the display 25 during the reproduction of the moving image data 6 described in FIG. 3. With respect to the moving image data 6, the cause object determining part 21d determines the pedestrian Sb1 as the cause object.

As shown in the figure, in the frame Fb and frame Fc of the images captured in the time at which the sudden braking occurred, the pedestrian Sb1 which is the cause object is highlighted by the marker M. During the reproduction of the moving image data, since the cause object is highlighted like this, the user can easily understand afterward the cause object which has been the cause of the sudden braking.

Figure 10:
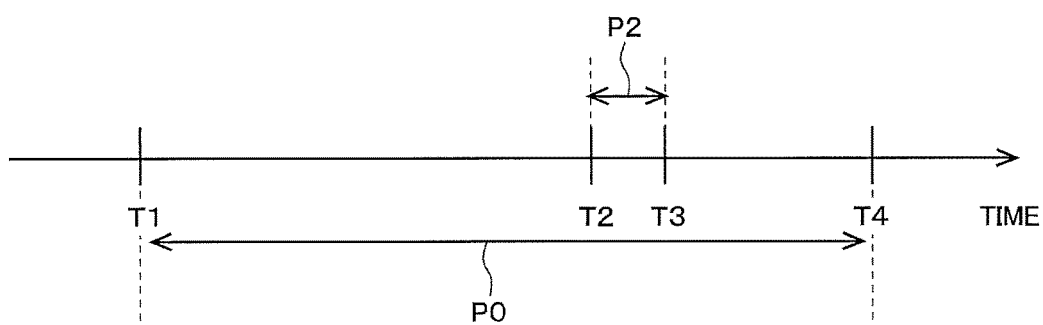
FIG. 10 illustrates the reproduction period of the moving image data.

The moving image reproduction part 21c highlights the cause object at the time at which the sudden braking occurred. FIG. 10 illustrates a reproduction period PO of the moving image data.

A time point T1 in FIG. 10 is a starting point of the reproduction period PO of the moving image data, and a time point T4 is an ending point of the reproduction period PO of the moving image data. A time period from a time point T2 to a time point T3 of the reproduction period PO corresponds to the time at which the sudden braking P2 occurred.

The moving image reproduction part 21c highlights the cause object at the time at which such the sudden braking P2 occurred, during the reproduction of the moving image data. By highlighting the cause object at the time at which the sudden braking P2 occurred, a user can understand the time at which the sudden braking occurred and can easily understand the status of the cause object at the time at which such sudden braking occurred.

Figure 11:
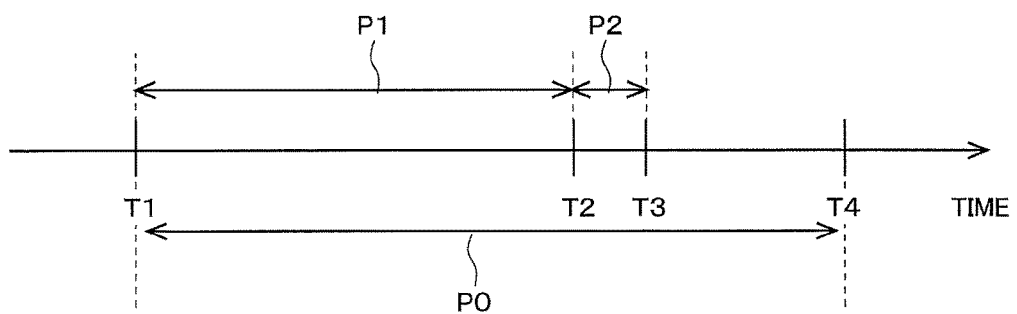
FIG. 11 illustrates the reproduction period of the moving image data.

The moving image reproduction part 21c may highlight the cause object during the period prior to or after the time at which the sudden braking occurred. For example, as shown in FIG. 11, not only at the time at which the sudden braking P2 occurred but also in the period P1 prior to the time at which the sudden braking P2 occurred, the moving image reproduction part 21c may highlight the cause object.

Figure 12:
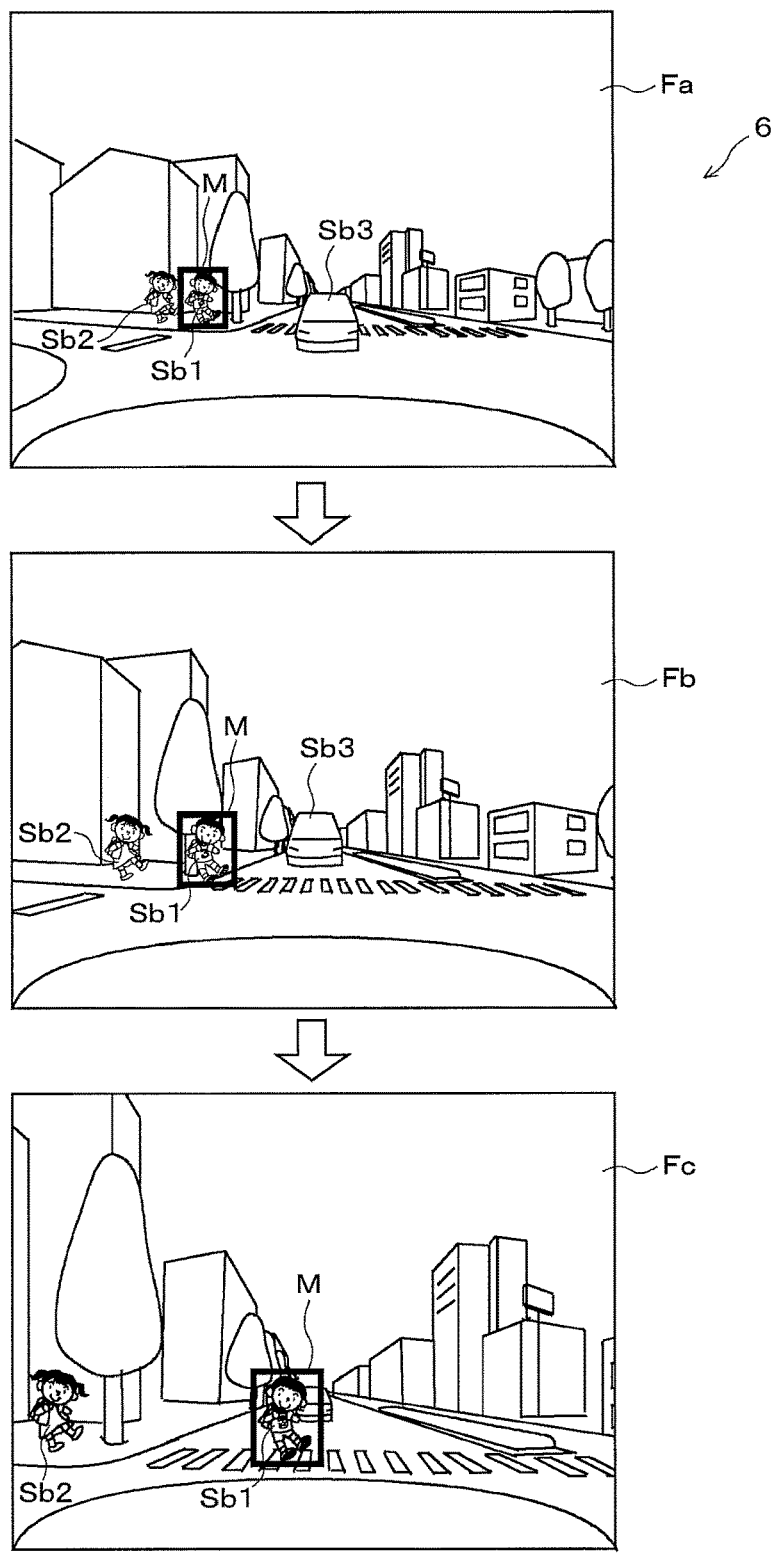
FIG. 12 illustrates a display example of the display during the reproduction of the moving image data.

FIG. 12 illustrates a display example of the display 25 during the reproduction of the moving image data. In this case, also in the frame Fa prior to the time at which the sudden braking occurred, the pedestrian Sb1 which is the cause object is highlighted by the marker M. Thus, by highlighting the cause object prior to the time at which the sudden braking P2 occurred, the user can easily understand the status of the cause object at the time point prior to the time at which the sudden braking P2 occurred. That is, the user can easily understand previous movement of the cause object which has been the cause of the sudden braking.

As described above, the data processing apparatus 2 in the embodiment processes the moving image data showing the vicinity of the vehicle 5 recorded by the drive recorder 4 while the vehicle 5 is running In the data processing apparatus 2, the behavioral information acquiring part 21a acquires the behavioral information on the sudden braking during the image capturing period of the moving image data and the object information acquiring part 21b acquires the object information on the object in the vicinity of the vehicle 5 during the image capturing period of the moving image data. The memory 24 stores the behavioral information 6a and the object information 6b acquired by associating them with the moving image data 6. And the cause object determining part 21d determines the cause of the sudden braking based on the behavioral information 6a and the object information 6b relating to the same moving image data 6. Therefore, the cause of the sudden braking can be understood easily afterward. Also, the cause of the sudden braking can be determined objectively based on the behavioral information and the object information instead of a subjective view of the user.

Also, the cause object determining part 21d determines the cause object which is the object in the vicinity of the vehicle 5 which has been the cause of the sudden braking. Therefore, the cause object can be understood easily.

Also, the cause object determining part 21d determines, as the cause object, the object that has existed in the travelling direction of the vehicle 5 at the time at which the sudden braking occurred. Therefore, the cause object can be determined appropriately.

Also, the moving image reproduction part 21c reproduces the moving image data, while highlighting the cause object in a reproduced image. Therefore, the user can easily understand what the cause object is during the reproduction of the moving image data.

<2. Second Embodiment>

Next, a second embodiment is described. Since the configuration and the operation of a data processing apparatus 2 in the second embodiment is almost the same as the first embodiment, differences with the first embodiment are mainly described below in detail. In the second embodiment, a degree of risk of a cause object is derived and the cause object is highlighted in a mode depending on the degree of the risk.

Figure 13:
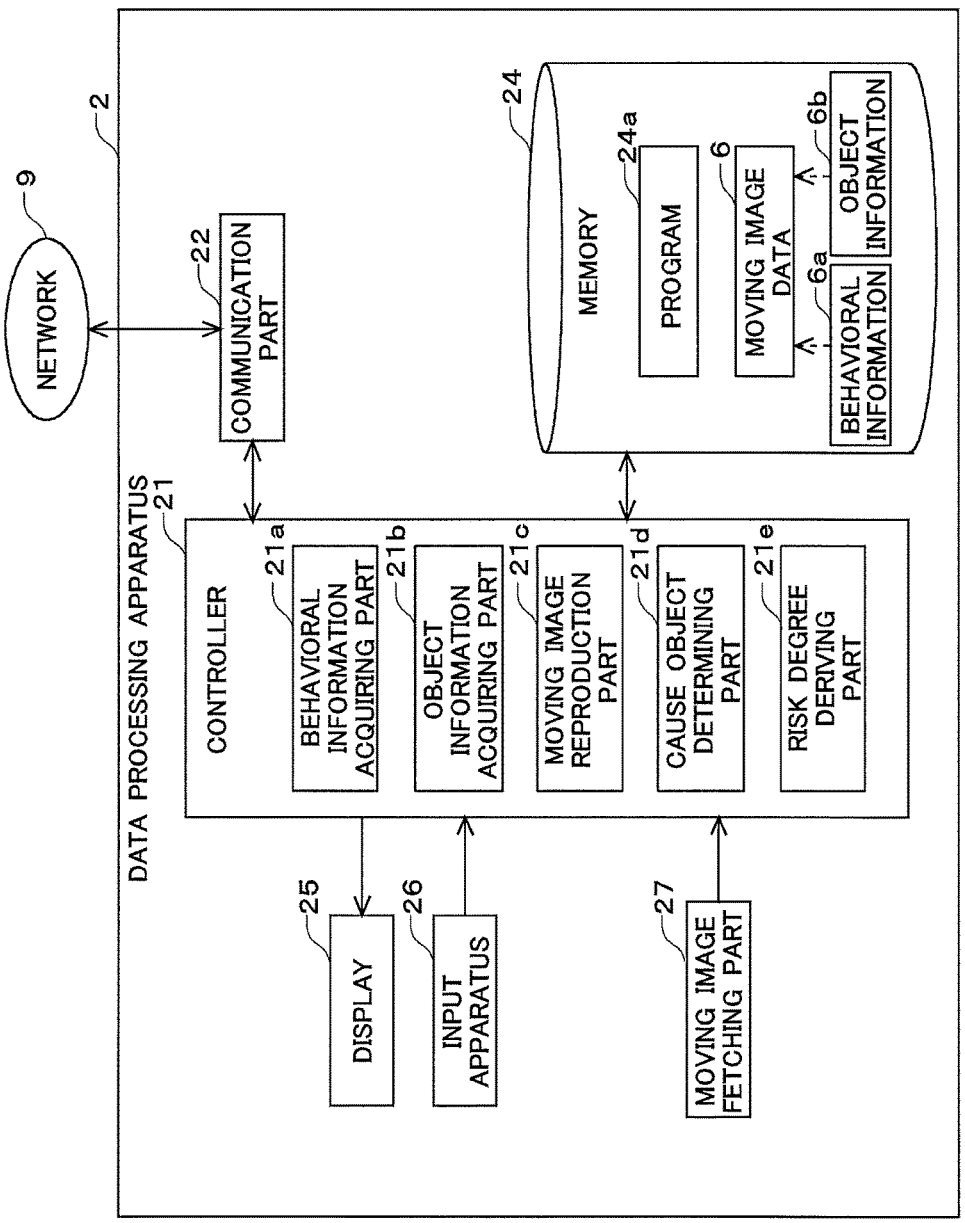
FIG. 13 illustrates the configuration of a data processing apparatus in the second embodiment.

FIG. 13 illustrates a configuration of the data processing apparatus 2 in the second embodiment. The configuration of the data processing apparatus 2 is obtained by adding a risk degree deriving part 21e to the data processing apparatus 2 in the first embodiment. The risk degree deriving part 21e is a part of functions of the data processing apparatus 2 implemented by executing a program 24a.

The risk degree deriving part 21e derives the degree of risk indicating the degree of risk of an accident with respect to the cause object. The risk degree deriving part 21e derives the degree of risk based on a velocity of the vehicle 5 at a starting point of a sudden braking as well as a position and a distance of the cause object at an ending point of the sudden braking and others.

The velocity of the vehicle 5 at the starting point of the sudden braking is obtained from additional information of the moving image data. Also, the position and the distance of the cause object at the ending point of the sudden braking can be derived based on an intra-frame position included in object information of the moving image data.

The risk degree deriving part 21e derives the degree of risk higher as the velocity of the vehicle 5 at the starting point of the sudden braking is higher. Also, the risk degree deriving part 21e derives the degree of risk higher as the position of the cause object at the ending point of the sudden braking is closer to a middle of the vehicle 5 in a horizontal direction. Furthermore, the risk degree deriving part 21e derives the degree of risk higher as the distance of the cause object at the ending point of the sudden braking is closer to the vehicle 5.

The risk degree deriving part 21e derives such degree of risk when a cause object determining part 21d determines the cause object in a cause determining processing (a step S36 in FIG. 7). In the case where the cause object determining part 21d determines a plurality of cause objects, the risk degree deriving part 21e derives the degree of risk with respect to each of the plurality of the cause objects. The degree of risk derived by the risk degree deriving part 21e is to be a part of an object information 6b associated with a target moving image data 6 in the latter step S37.

Figure 14:
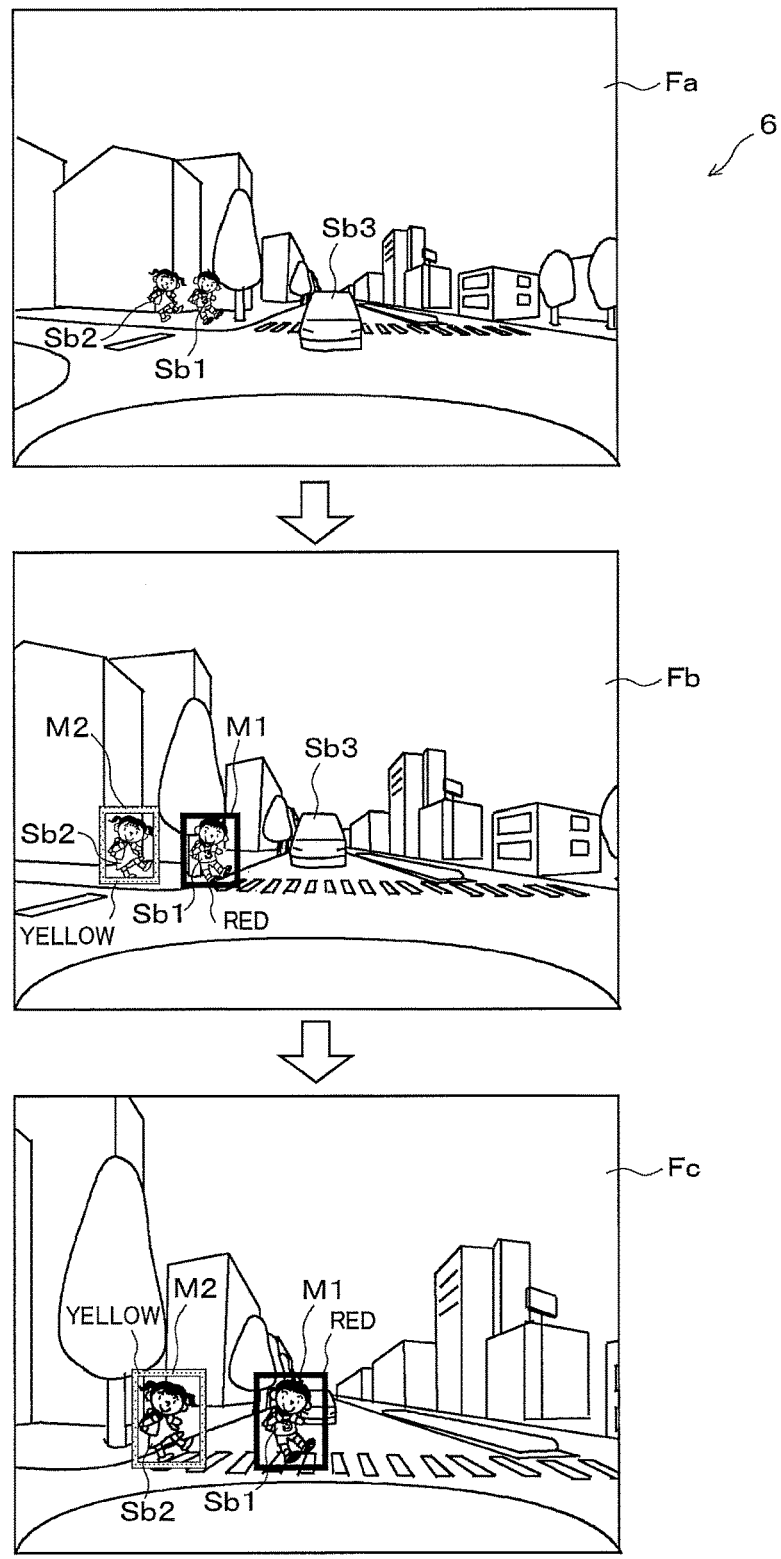
FIG. 14 illustrates a display example of the display during the reproduction of the moving image data in the second embodiment.

Also, a moving image reproduction part 21c, during the reproduction of the moving image data, highlights the cause object in a mode depending on the degree of risk. FIG. 14 illustrates a display example of a display 25 during the reproduction of the moving image data in the second embodiment.

With respect to the moving image data 6 shown in FIG. 14, the cause object determining part 21d determines both a pedestrian Sb1 and a pedestrian Sb2 as the cause objects. And, the risk degree deriving part 21e derives the degree of risk of the pedestrian Sb1 relatively higher and the degree of risk of the pedestrian Sb2 relatively lower.

In this case, as shown in the figure, the moving image reproduction part 21*c* highlights the pedestrian Sb1 with high degree of risk in a red marker M1, and highlights the pedestrian Sb2 with low degree of risk in a yellow marker M2. The moving image reproduction part 21*c* compares the degree of risk of the cause objects with a predetermined threshold value and determines the mode of highlighting the cause object based on the comparison results. Thus, by highlighting the cause object in the mode depending on the degree of risk, the user can easily understand the degree of risk of the cause object. The mode of highlighting that is different depending on the degree of risk is not limited to color of the marker but may be shape, size, or thickness or others.

<3. Third Embodiment>

<3-1. Outline of the Data Processing Apparatus>

Next, the third embodiment is described. Since the configuration and operation of a data processing apparatus 2 in the third embodiment is almost the same as the first embodiment, differences with the first embodiment are mainly described below in detail. In the first embodiment, the cause object which is the cause of the sudden braking is determined. On the other hand, in the third embodiment, the state of a driver of a vehicle 5 which has been a cause of a sudden braking is determined.

Figure 15:
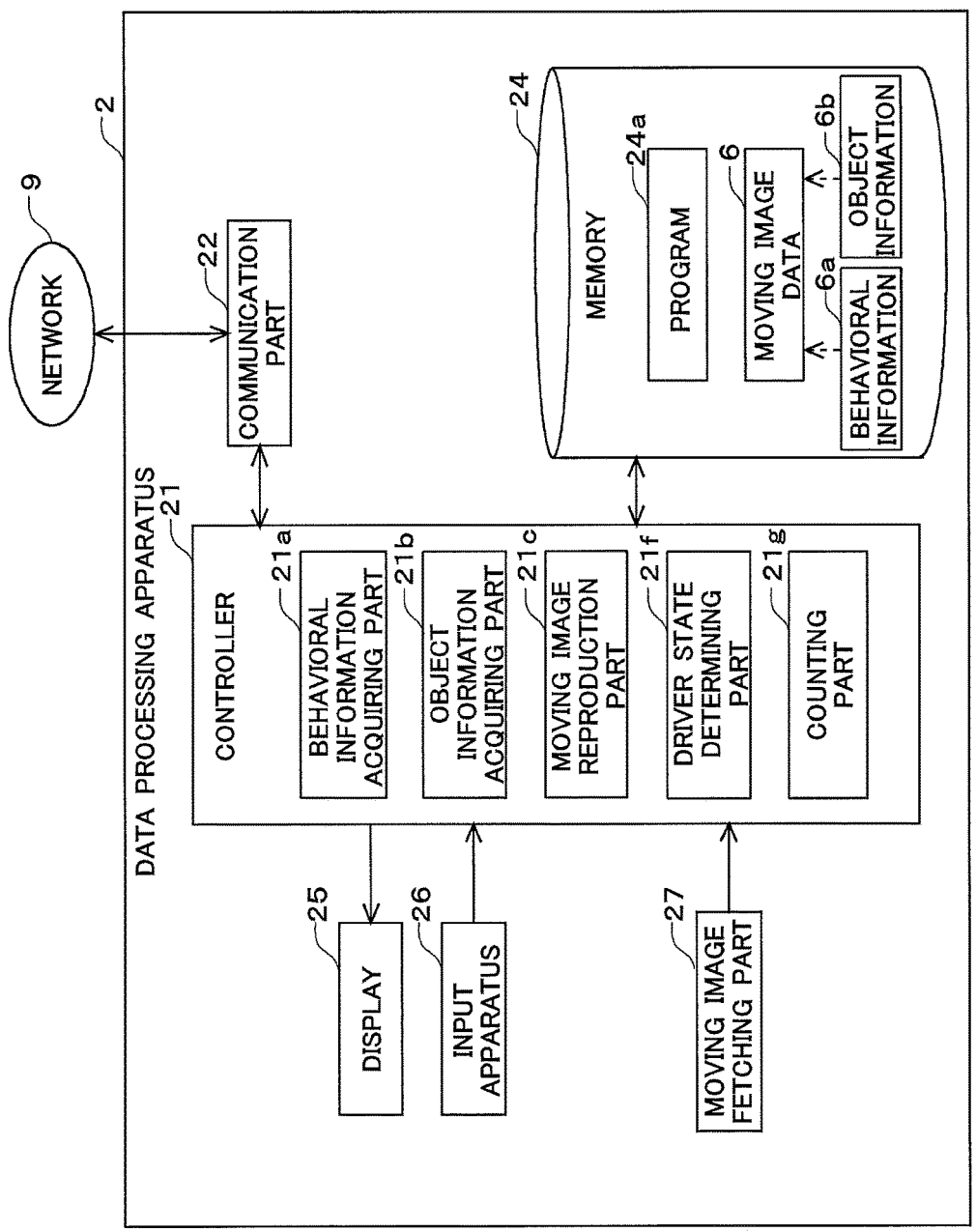
FIG. 15 illustrates the configuration of a data processing apparatus in the third embodiment.

FIG. 15 illustrates a configuration of the data processing apparatus 2 in the third embodiment. The data processing apparatus 2, instead of the cause object determining part 21*d* of the data processing apparatus 2 in the first embodiment, includes a driver state determining part 21*f* and a counting part 21*g*. Other configuration of the data processing apparatus 2 in the third embodiment are the same as the first embodiment. The driver state determining part 21*f* and the counting part 21*g* are parts of functions implemented by the execution of a program 24*a*.

The driver state determining part 21*f* determines the state of the driver which caused the sudden braking in the case where the sudden braking is applied during an image capturing period of a moving image data. Also, the counting part 21*g* counts, per driver, the number of the moving image data relating to the sudden braking of which a cause is determined to be driver distraction (hereinafter referred to simply as "distraction"). In the following, details of the processing of the driver state determining part 21*f* and the counting part 21*g* are described.

<3-2. Cause Determining Processing>

Figure 16:
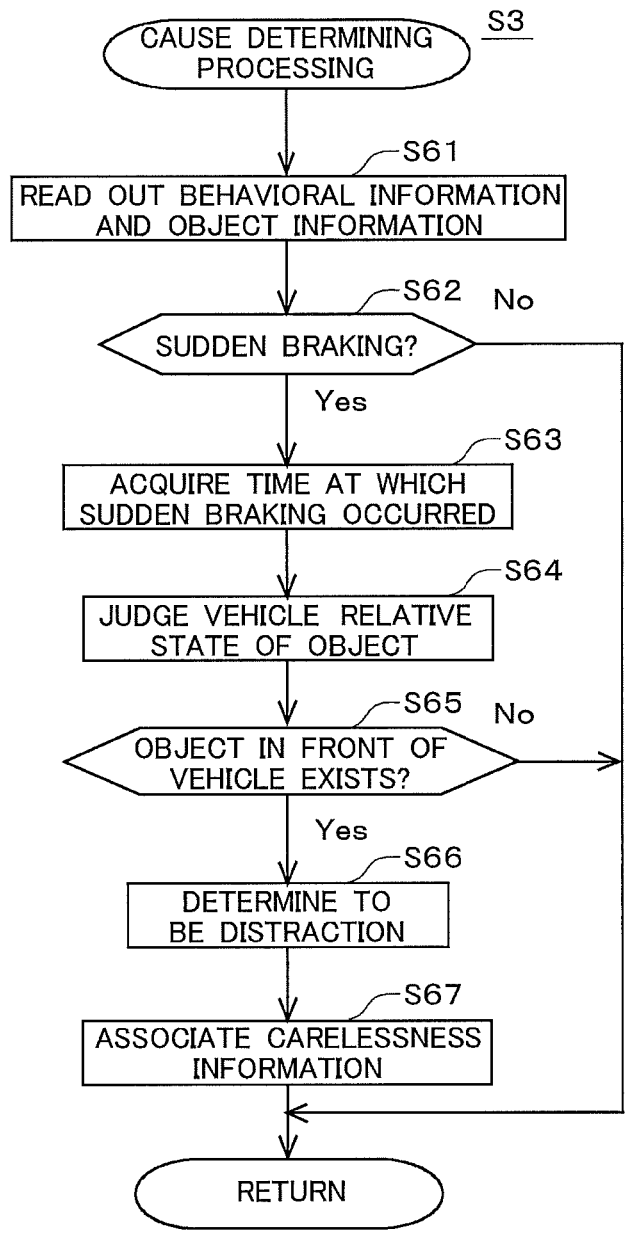
FIG. 16 illustrates the flow of the cause determining processing in the third embodiment.

In the data processing apparatus 2 in the third embodiment, different from the first embodiment, the driver state determining part 21*f* executes a cause determining processing (the step S3 in FIG. 5). The cause determining processing in the third embodiment is described below. FIG. 16 illustrates a flow of the cause determining processing in the third embodiment. In the description, the moving image data to be processed is referred to as "target moving image data."

First, the driver state determining part 21*f* reads out a behavioral information 6*a* and an object information 6*b* associated with the target moving image data 6 from a memory 24 (a step S61). Next, the driver state determining part 21*f* refers to whether or not the sudden braking is applied during the image capturing period of the target moving image data shown by the behavioral information. Thereby, in the case where there is no sudden braking (No in a step S62), the cause determining processing is ended.

Meanwhile, in the case where there is the sudden braking (Yes in the step S62), the driver state determining part 21*f*, based on the behavioral information and the object information, determines the state of the driver which has been the cause of the sudden braking. The driver state determining part 21*f* determines, based on the position of the object in the vicinity of the vehicle 5 at the time at which the sudden braking occurred, whether or not the cause of the sudden braking is the distraction of the driver.

Specifically, the driver state determining part 21*f*, referring to the behavioral information, acquires the time at which the sudden braking occurred in the target moving image data (the step S63).

Subsequently, the driver state determining part 21*f* judges the vehicle relative state of each object in the vicinity of the vehicle 5 at the time at which the sudden braking occurred (a step S 64). That is, the driver state determining part 21*f* identifies frames corresponding to the time at which the sudden braking occurred, and judges the vehicle relative state of each object in the identified frames. The driver state determining part 21*f* judges the relative state of each object against the vehicle 5 is applicable to any of "existing in front of the vehicle," "existing on the side of the vehicle" and "across the front of the vehicle."

Then, in the case where the object has existed in the front in a travelling direction of the vehicle 5 at the time at which a sudden braking occurred (Yes in a step S65), the driver state determining part 21*f* determines that the cause of the sudden braking is the distraction of the driver (a step S66). The driver state determining part 21*f* judges that the object of which vehicle relative state is "existing in front of the vehicle" or "across the front of the vehicle" to be the object that exists in front of the vehicle 5.

In the case where the cause of the sudden braking is determined to be the distraction of the driver, the driver state determining part 21*f* associates the carelessness information indicating the distraction of the driver with the target moving image data and stores the associated carelessness information in the memory 24 (a step S67). Herewith, the carelessness information is associated to the moving image data relating to the distraction (to be exact, the moving image data relating to the sudden braking of which cause is determined to be the distraction).

In the case where no object has existed in front of the vehicle 5 at the time at which the sudden braking occurred (No in the step S65), the cause of the sudden braking is determined not to be the distraction of the driver and the cause determining processing is ended directly.

<3-3. The Moving Image Selection Processing>

Thus, the carelessness information associated with the moving image data is used in the moving image selection processing to select the moving image data to be a reproduction target (the step S4 in FIG. 5).

Figure 17:
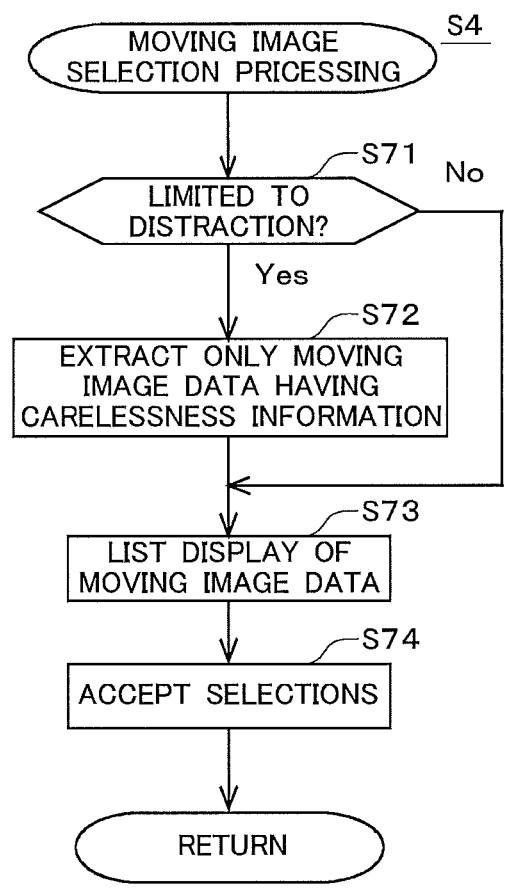
FIG. 17 illustrates the flow of the moving image selection processing in the third embodiment.

FIG. 17 illustrates a flow of the moving image selection processing in the third embodiment. First, a moving image reproduction part 21*c* determines whether or not an option to limit to distraction is designated by a user (a step S71).

In the case where the user desires to select the moving image data to be the reproduction target among only the moving image data relating to the distraction, the user designates the option to limit to the distraction.

In the case where the option to limit to the distraction is not designated (No is the step S71), the moving image reproduction part 21*c* displays in a list all the moving image data stored in the memory 24 on the display 25 as a candidate for the reproduction target (a step S73). And, the moving image reproduction part 21*c* accepts the selection of the moving image data by the user (a step S74).

Meanwhile, in the case where the option to limit to the distraction is designated (Yes in step S71), the moving image reproduction part 21*c* extracts only the moving image data to which the carelessness information is associated from among all the moving image data stored in the memory 24 (a step S72). Herewith, the moving image reproduction part 21c extracts only the moving image data relating to the distraction. Then, the moving image reproduction part 21c displays in a list all the moving image data extracted on the display 25 as candidates for the reproduction target (a step S73).

Figure 18:
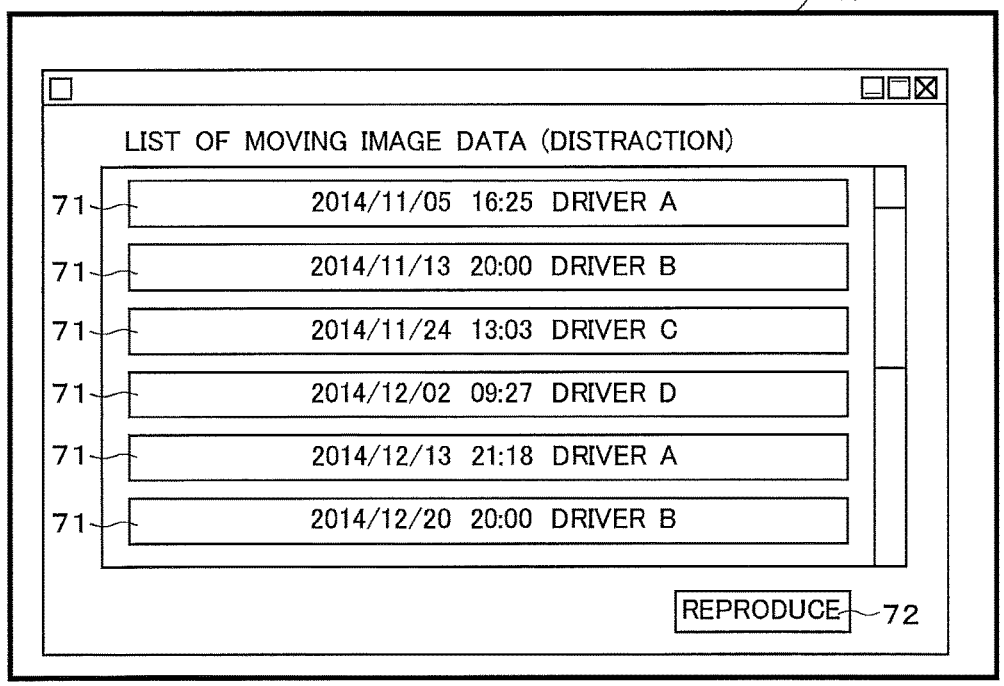
FIG. 18 illustrates a state of list display of the moving image data relating to distraction.

FIG. 18 illustrates a state in which a display 25 displays in a list only the moving image data relating to the distraction. In the display 25, information on the moving image data (date, driver name, etc.) relating to the distraction is displayed as item 71 respectively. The user can select the desired moving image data as the moving image data to be the reproduction target by clicking the reproduction button 72 after temporary selecting any of items 71 using the input apparatus 26.

Since only the moving image data relating to the distraction is displayed in a list, the user can easily select the moving image data relating to the distraction having a high risk of accidents as the moving image data to be reproduced.

When the reproduction button 72 is clicked, the moving image reproduction part 21c accepts the selection of the moving image data by the user (the step S74). And, the moving image reproduction part 21c executes a reproduction processing (the step S5 in FIG. 5) for reproducing the selected moving image data.

Figure 19:
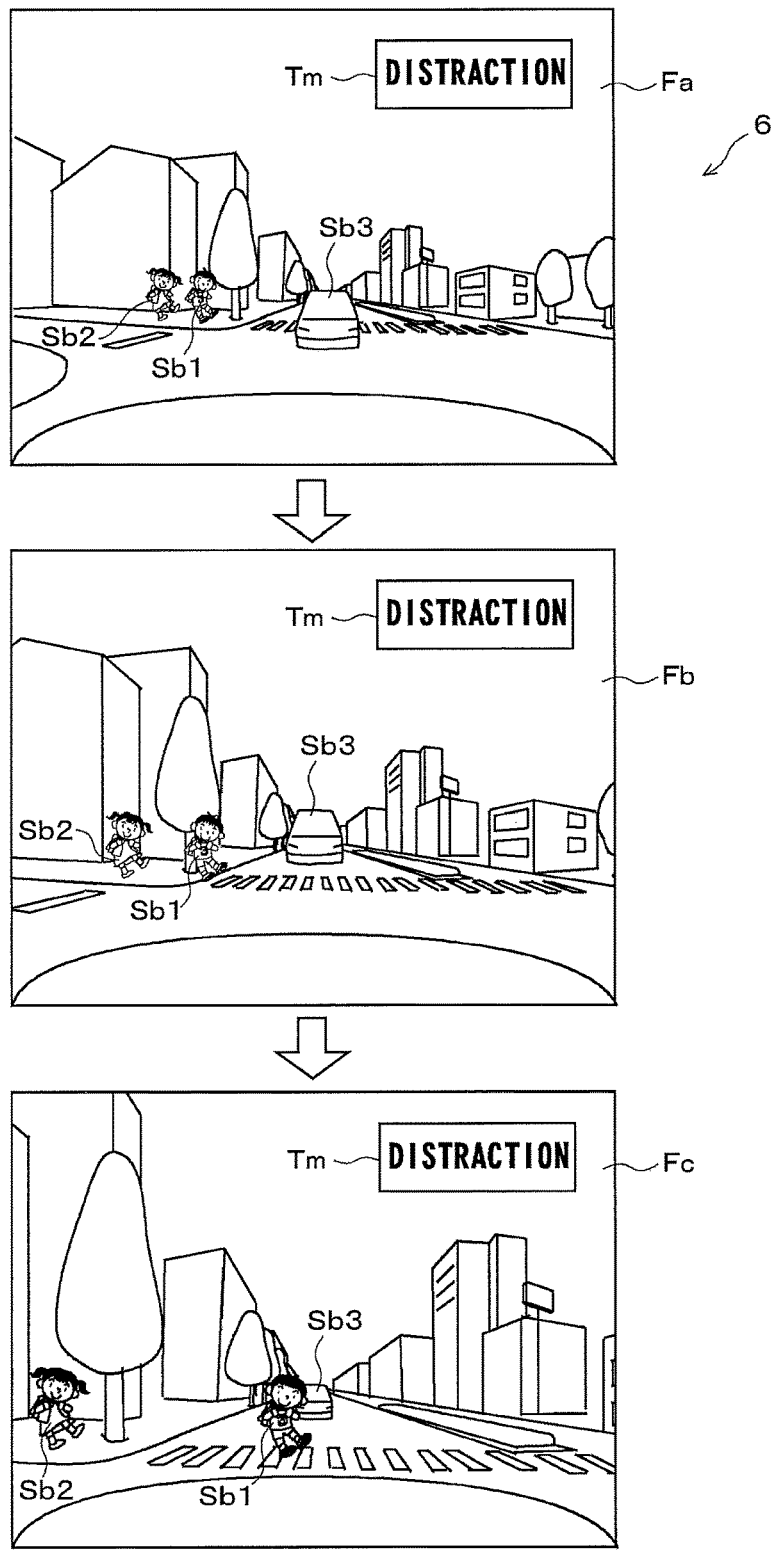
FIG. 19 illustrates a display example of the display during the reproduction of the moving image data in the third embodiment.

FIG. 19 illustrates a display example of the display 25 during the reproduction of the moving image data relating to the distraction. In this case, as shown in the figure, a message Tm is displayed overlapped on each frame. The message Tm indicates that the moving image data during reproduction is the moving image data relating to the distraction. Based on such message Tin, the user can easily understand that the moving image data 6 during reproduction is the moving image data relating to the distraction.

Only at the time at which the sudden braking occurred, such message Tm may be displayed. Also, in the third embodiment, same as the first and second embodiments, during the reproduction of the moving image data, the cause object may be highlighted.

<3-4. Counting Processing>

Figure 20:
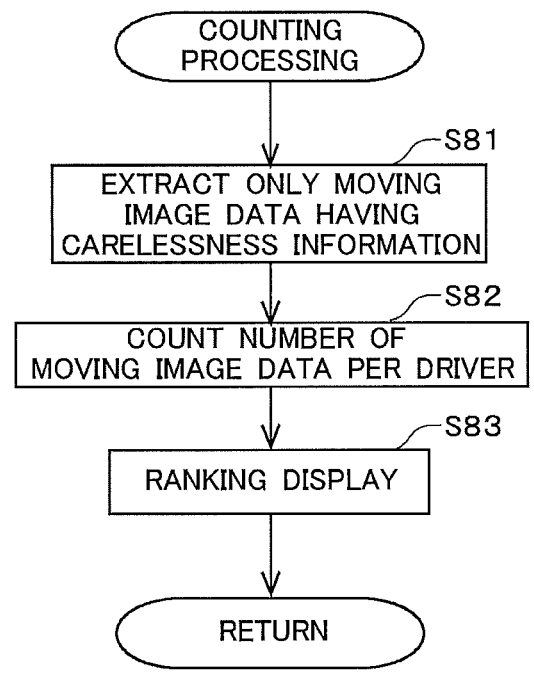
FIG. 20 illustrates the flow of the counting processing.

Also, in the data processing apparatus 2 in the third embodiment, the counting processing is executed appropriately with the instruction by the user. The counting processing is conducted independently from the main processing illustrated in FIG. 5. FIG. 20 illustrates a flow of the counting processing. The counting processing is described below.

First, the counting part 21g extracts only the moving image data associated with the carelessness information from all the moving image data stored in the memory 24 (a step S81). Herewith, the counting part 21g extracts only the moving image data relating to the distraction.

Next, the counting part 21g counts, per driver, the number of the moving image data relating to the distraction (a step S82). The counting part 21g discerns, based on a driver code included in additional information of the moving image data, the driver of the vehicle 5 on which each moving image data is recorded.

Figure 21:
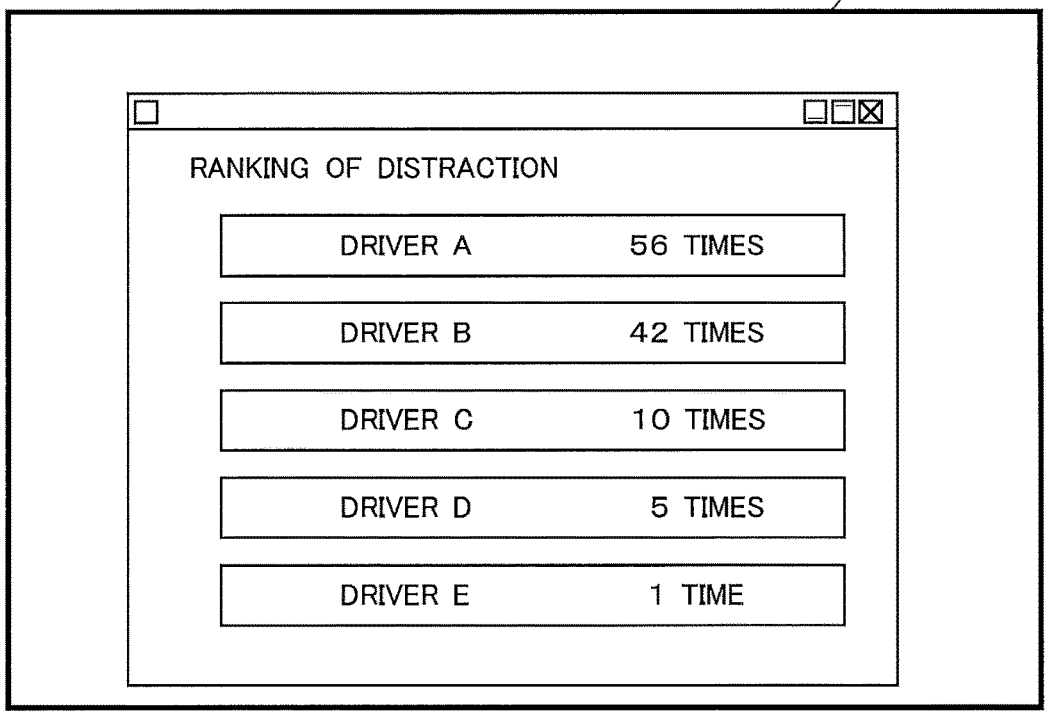
FIG. 21 illustrates a display of ranking of drivers.

Next, the counting part 21g displays a ranking of drivers based on the number of the moving image data relating to the distraction (a step S83). FIG. 21 illustrates a state in which the display 25 shows a ranking of drivers. In the display 25, driver names are displayed in conjunction with the number of times of distraction in decreasing order of the number of the moving image data relating to the distraction (i.e. the number of times of the distraction). Based on such ranking of drivers, the user can easily understand drivers (taxi drivers) with many number of times of distraction.

As described above, in the data processing apparatus 2 in the third embodiment, the driver state determining part 21f determines the state of the driver of the vehicle 5 which has been the cause of the sudden braking. Therefore, the state of the driver of the vehicle 5 which has been the cause of the sudden braking can be understood easily afterward.

Also, the driver state determining part 21f determines the cause of the sudden braking as the distraction of the driver based on the position of the object in the vicinity of the vehicle 5 at the time at which the sudden braking occurred. Therefore, it can be easily understood afterward that the cause of the sudden braking is the distraction of the driver.

Also, the display 25 displays in a list the moving image data relating to the sudden braking of which cause is determined to be the distraction. Therefore, the moving image data relating to the distraction can be selected easily.

Also, the counting part 21g counts, per driver, the number of the moving image data relating to the sudden braking of which the cause has been determined to be the distraction. Therefore, the driver with many number of times of carelessness can be understood easily.

<4. Modifications>

As above, having thus described some embodiments, the invention is not limited to the foregoing embodiments, and various variations are possible. In the following, such variations will be described. All aspects including the embodiments described above as well as the modifications described below may be combined appropriately.

In the foregoing embodiment, although the specific behavior of the vehicle 5 of which cause is targeted to be determined is described as the sudden braking, the specific behavior of the vehicle 5 may be other behaviors such as abrupt steering. Whether or not the abrupt steering is made during an image capturing period of a moving image data can be determined afterward based on time-series data of an acceleration of the vehicle 5 and others.

Also, in the foregoing embodiment, the travelling direction of the vehicle 5 is assumed to be forward and based on the object existed in front of the vehicle 5 at a time at which specific behavior occurred, the cause of the specific behavior is determined. On the contrary, in the case where a travelling direction of the vehicle 5 is not forward, a cause of a specific behavior may be determined based on an object existed in the travelling direction of a vehicle 5 at the time at which the specific behavior occurred. For example, in the case a sudden braking is applied during a right turn, the cause of the sudden braking may be determined based on the object existed in the right side of the vehicle 5 at the time at which the sudden braking occurred.

Also, in the foregoing embodiment, the cause object is highlighted with a marker. However, a cause object may be highlighted with other methods such as highlighting a color saturation of an image of the cause object.

Also, in the foregoing embodiment, the drive recorder 4 adopts a trigger recording system for recording the moving image data in the case where an incident occurred. However, an always recording system may also be adopted for continuously recording a moving image data from a start of driving until a stop of driving. In the case where the always recording system is adopted, if a drive recorder 4 records time-series data of a velocity and an acceleration of a vehicle 5 during an image capturing period of a moving image data in conjunction with the moving image data, the time at which the specific behavior occurred can be identified afterward.

Also, in the foregoing embodiment, the server 1 includes the function for performing the object recognition processing based on the moving image data. On the contrary, a data processing apparatus 2 may include a function for performing a similar object recognition processing.

Also, functions described as a single block in the foregoing embodiments are not necessarily implemented by a single physical element, but may be implemented by distributed physical elements. Also, functions described as a plurality of blocks in the foregoing embodiments may be implemented by a single physical element. Also, one function may be implemented as a whole, by making the apparatus in the vehicle and outside the vehicle share the processing relating to one function and by making these apparatus share information via communication between these apparatus.

Also, in the foregoing embodiment, any or all of the functions described to be implemented by software by executing programs may be implemented by electrical hardware circuit, and any or all of the functions described to be implemented by electrical hardware circuit may be implemented by software. Also, the function described as one block in the foregoing embodiment may be implemented by the cooperation of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A data processing apparatus for processing moving image data previously captured by a drive recorder of a vehicle and that shows a vicinity of the vehicle and that was recorded while the vehicle was running, the data processing apparatus comprising:
    a controller configured to:
        acquire behavioral information of the vehicle that occurred while the vehicle was running during an image capturing period of the moving image data by the drive recorder;
        determine whether the acquired behavioral information indicates that a specific behavior of the vehicle occurred while the vehicle was running and, when the specific behavior is determined to have occurred, record the acquired behavioral information and the moving image data acquired during the image capturing period in which the specific behavior occurred;
        acquire object information on an object in the vicinity of the vehicle during the image capturing period of the moving image data, the object information including a vehicle relative state of each of one or more recognized objects, the vehicle relative state being a position of the recognized object relative to the vehicle;
        determine (1) a cause of the specific behavior of the vehicle that occurred while the vehicle was running while the drive recorder was capturing the moving image data based on the behavioral information and the object information relating to the moving image data, and (2) a cause object in the vicinity of the vehicle, the cause object having been determined to be the cause of the specific behavior of the vehicle; and
        reproduce the moving image data, while highlighting the cause object in a reproduced image, wherein
        the controller determines the cause of the specific behavior of the vehicle, based on a position of the object in the vicinity of the vehicle at a time at which the specific behavior of the vehicle occurred.

2. The data processing apparatus according to claim 1, wherein
    the controller determines, as the cause object, an object located ahead of the vehicle in a travelling direction of the vehicle at the time at which the specific behavior of the vehicle occurred.

3. The data processing apparatus according to claim 1, wherein
    the controller highlights the cause object in the reproduced image at the time at which the specific behavior of the vehicle occurred during reproduction of the moving image data.

4. The data processing apparatus according to claim 1, wherein
    the controller highlights the cause object in the reproduced image starting at a time that is prior to the time at which the specific behavior of the vehicle occurred during the reproduction of the moving image data.

5. The data processing apparatus according to claim 1, wherein:
    the controller derives a degree of risk related to the cause object, and
    the controller uses a mode of highlighting that varies depending on the degree of risk.

6. The data processing apparatus according to claim 1, wherein
    the controller determines a state of a driver of the vehicle, the state of the driver having been determined to be the cause of the specific behavior of the vehicle.

7. The data processing apparatus according to claim 6, wherein
    the controller determines, based on the position of the object in the vicinity of the vehicle at the time at which the specific behavior of the vehicle occurred, that the cause of the specific behavior of the vehicle is distraction of the driver.

8. The data processing apparatus according to claim 7, further comprising:
    a display that displays in a list the moving image data relating to the specific behavior of which the cause has been determined to be the distraction of the driver.

9. The data processing apparatus according to claim 7, wherein
    the moving image data is associated with the driver of the vehicle for which the moving image data has been recorded, and
    the controller counts, for each different driver of the vehicle, a number of the moving image data relating to the specific behavior of which the cause has been determined to be the distraction of the driver.

10. The data processing apparatus according to claim 1, wherein
    the specific behavior is sudden braking of the vehicle.

11. A data processing method for processing moving image data previously captured by a drive recorder of a vehicle and that shows a vicinity of the vehicle and that was recorded while the vehicle was running, the data processing method comprising the steps of:

(a) acquiring, with a controller, behavioral information of the vehicle that occurred while the vehicle was running during an image capturing period of the moving image data by the drive recorder;

(b) determining, with the controller, whether the acquired behavioral information indicates that a specific behavior of the vehicle occurred while the vehicle was running and, when the specific behavior is determined to have occurred, recording the acquired behavioral information and the moving image data acquired during the image capturing period in which the specific behavior occurred;

(c) acquiring, with the controller, object information on an object in the vicinity of the vehicle during the image capturing period of the moving image data, the object information including a vehicle relative state of each of one or more recognized objects, the vehicle relative state being a position of the recognized object relative to the vehicle;

(d) determining, with the controller, (1) a cause of the specific behavior of the vehicle that occurred while the vehicle was running while the drive recorder was capturing the moving image data based on the behavioral information and the object information relating to the moving image data, and (2) a cause object in the vicinity of the vehicle, the cause object having been determined to be the cause of the specific behavior of the vehicle; and (e) reproducing, with the controller, the moving image data, while highlighting the cause object in a reproduced image, wherein the cause of the specific behavior of the vehicle is determined based on a position of the object in the vicinity of the vehicle at a time at which the specific behavior of the vehicle occurred.

12. The data processing method according to claim 11, wherein the step (d) determines a state of a driver of the vehicle, the state of the driver having been determined to be the cause of the specific behavior of the vehicle.

13. A non-transitory computer-readable recording medium that stores a program to be executed by a computer included in a data processing apparatus configured to process moving image data previously captured by a drive recorder of a vehicle and that shows a vicinity of the vehicle and that was recorded while the vehicle was running, the program causing the computer to execute the steps of:

(a) acquiring behavioral information of the vehicle that occurred while the vehicle was running during an image capturing period of the moving image data by the drive recorder;

(b) determining whether the acquired behavioral information indicates that a specific behavior of the vehicle occurred while the vehicle was running and, when the specific behavior is determined to have occurred, recording the acquired behavioral information and the moving image data acquired during the image capturing period in which the specific behavior occurred;

(c) acquiring object information on an object in the vicinity of the vehicle during the image capturing period of the moving image data, the object information including a vehicle relative state of each of one or more recognized objects, the vehicle relative state being a position of the recognized object relative to the vehicle;

(d) determining (1) a cause of the specific behavior of the vehicle that occurred while the vehicle was running while the drive recorder was capturing the moving image data based on the behavioral information and the object information relating to the moving image data, and (2) a cause object in the vicinity of the vehicle, the cause object having been determined to be the cause of the specific behavior of the vehicle; and (e) reproducing the moving image data, while highlighting the cause object in a reproduced image, wherein the cause of the specific behavior of the vehicle is determined based on a position of the object in the vicinity of the vehicle at a time at which the specific behavior of the vehicle occurred.

14. The recording medium according to claim 13, wherein the step (d) determines a state of a driver of the vehicle, the state of the driver having been determined to be the cause of the specific behavior of the vehicle.

* * * * *